(12) United States Patent
Miyamoto et al.

(10) Patent No.: US 8,386,711 B2
(45) Date of Patent: Feb. 26, 2013

(54) MANAGEMENT METHOD AND MANAGEMENT SYSTEM FOR COMPUTER SYSTEM

(75) Inventors: Yuuki Miyamoto, Yokohama (JP); Katsutoshi Asaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 333 days.

(21) Appl. No.: 12/936,472

(22) PCT Filed: Aug. 10, 2010

(86) PCT No.: PCT/JP2010/063512
§ 371 (c)(1),
(2), (4) Date: Oct. 5, 2010

(87) PCT Pub. No.: WO2012/020471
PCT Pub. Date: Feb. 16, 2012

(65) Prior Publication Data
US 2012/0042124 A1     Feb. 16, 2012

(51) Int. Cl.
*G06F 12/00* (2006.01)
(52) U.S. Cl. .................. 711/117; 711/114; 711/154
(58) Field of Classification Search .................. None
See application file for complete search history.

(56) References Cited

U.S. PATENT DOCUMENTS

| | | |
|---|---|---|
| 2006/0224844 A1 | 10/2006 | Kano et al. |
| 2007/0055713 A1 | 3/2007 | Nagai et al. |
| 2007/0067588 A1 | 3/2007 | Kano et al. |
| 2007/0283079 A1 | 12/2007 | Iwamura et al. |
| 2010/0023566 A1 | 1/2010 | Minamino et al. |

FOREIGN PATENT DOCUMENTS

| | | |
|---|---|---|
| JP | 2006-277723 A | 10/2006 |
| JP | 2007-066259 A | 3/2007 |
| JP | 2010-026919 A | 2/2010 |
| WO | 2005017737 A2 | 2/2005 |

*Primary Examiner* — Yong Choe
*Assistant Examiner* — Daniel Tsui
(74) *Attorney, Agent, or Firm* — Volpe And Koenig, P.C.

(57) ABSTRACT

The present invention provides a technique to efficiently rearrange data in actual regions.
A management system acquires load lumped region variation information (access distribution variation amount) indicative of a variation in the position of a virtual region in a virtual volume in a storage subsystem which region corresponds to a hot spot. Then, based on the load lumped region variation information, the management system determines a load position unvaried hour(s) indicative of a hour(s) in which the position of the virtual region corresponding to the hot spot is almost or perfectly unvaried (the hour(s) in which the position of the hot spot is stable). The management system then displays the load position unvaried hour(s) on a display device (see FIG. 19).

15 Claims, 20 Drawing Sheets

FIG. 4

| RAID group ID | Device type | RAID level | Corresponding PDEV ID |
|---|---|---|---|
| RAID group 1 | SSD | RAID 5 (3D+1P) | PDEV1 |
| | | | PDEV2 |
| | | | PDEV3 |
| | | | PDEV4 |
| RAID group 2 | FC | RAID 5 (3D+1P) | PDEV5 |
| | | | PDEV6 |
| | | | PDEV7 |
| | | | PDEV8 |
| RAID group 3 | SATA | RAID 0 | PDEV9 |
| | | | PDEV10 |

FIG. 5

| RAID group ID | Actual region ID | RG LBA range | Assignment status |
|---|---|---|---|
| RAID group 1 | SEG1 | 0 – 999 | Assigned |
| | SEG2 | 1000 – 1999 | Assigned |
| | SEG3 | 2000 – 2999 | Assigned |
| RAID group 2 | SEG4 | 0 – 999 | Assigned |
| | SEG5 | 1000 – 1999 | Unassigned |
| RAID group 3 | SEG6 | 0 – 999 | Assigned |
| | SEG7 | 1000 – 1999 | Unassigned |
| ⋮ | ⋮ | ⋮ | ⋮ |

FIG. 11

| RAID group ID | Device type | RAID level |
|---|---|---|
| RAID group 1 | SSD | RAID 5 (3D+1P) |
| RAID group 2 | FC | RAID 5 (3D+1P) |
| RAID group 3 | SATA | RAID 0 |

FIG. 12

| RAID group ID | Actual region ID | RG LBA range | Assignment status |
|---|---|---|---|
| RAID group 1 | SEG1 | 0 – 999 | Assigned |
| | SEG2 | 1000 – 1999 | Assigned |
| | SEG3 | 2000 – 2999 | Assigned |
| RAID group 2 | SEG4 | 0 – 999 | Assigned |
| | SEG5 | 1000 – 1999 | Unassigned |
| RAID group 3 | SEG6 | 0 – 999 | Assigned |
| | SEG7 | 1000 – 1999 | Unassigned |
| ⋮ | ⋮ | ⋮ | ⋮ |

FIG. 13

| VVOL ID | VVOL LBA range | Actual region ID | Access count ||||  |
|---|---|---|---|---|---|---|---|
| | | | Values used for access distribution variation amount calculation process || Values used for rearrangement process || Rearrangement determination results |
| | | | Last-process access count | Last-process average value (IOPS) | Start-time access count | Average value (IOPS) | |
| Volume1 | 0 – 999 | SEG1 | 360000 | 120 | 621000 | 95 | Tier1 |
| | 1000 – 1999 | SEG4 | 180000 | 45 | 255600 | 48 | Tier2 |
| | 2000 – 2999 | SEG5 | 28800 | 10 | 37800 | 15 | Tier3 |
| Volume2 | 0 – 999 | SEG2 | 270000 | 80 | 486000 | 40 | Tier2 |
| Volume3 | 0 – 999 | SEG3 | 72000 | 20 | 108000 | 20 | Tier3 |

| Tier ID | Capability requirements | Allowable IOPS range |
|---|---|---|
| Tier1 | Device type=SSD, RAID level=RAID5 | At least 100 |
| Tier2 | Device type=FC, RAID level=RAID5 | At least 30 and less than 100 |
| Tier3 | Device type=SATA, RAID level=ANY | Less than 30 |

| VVOL ID | VVOL LBA range | Actual region ID | Access count | Rearrangement determination results |
|---|---|---|---|---|
| Volume1 | 0 – 999 | SEG1 | 792000 | Tier1 |
|  | 1000 – 1999 | SEG4 | 342000 | Tier2 |
|  | 2000 – 2999 | NULL | 64800 | NULL |
| Volume2 | 0 – 999 | SEG2 | 558000 | Tier2 |
| Volume3 | 0 – 999 | SEG3 | 144000 | Tier3 |

| VVOL ID | VVOL LBA range | Actual region ID | Access count | | | | |
|---|---|---|---|---|---|---|---|
| | | | Values used for access distribution variation amount calculation process | | Values used for rearrangement process | | Rearrangement determination results |
| | | | Last-process access count | Last-process average value (IOPS) | Start-time access count | Average value (IOPS) | |
| Volume1 | 0 – 999 | SEG1 | 360000 | 120 | 621000 | 95 | Tier1 |
| | 1000 – 1999 | SEG4 | 180000 | 45 | 255600 | 48 | Tier2 |
| | 2000 – 2999 | NULL | 28800 | 10 | 37800 | 15 | NULL |
| Volume2 | 0 – 999 | SEG2 | 270000 | 80 | 486000 | 40 | Tier2 |
| Volume3 | 0 – 999 | SEG3 | 72000 | 20 | 108000 | 20 | Tier3 |

2301 2302 2303 2304 2305 2306 2307 2308 2309

MANAGEMENT METHOD AND MANAGEMENT SYSTEM FOR COMPUTER SYSTEM

TECHNICAL FIELD

The present invention relates to a management method and a management system for a computer system, and for example, to a method for managing a storage region in a storage subsystem by dividing the storage region into a plurality of tiers, and a management system configured to carry out such management.

BACKGROUND ART

There has recently been an idea that a virtualization technique and a thin provisioning technique are combined with each other to allow a storage region to be managed in smaller units than logical volume (storage tier management technique).

In the storage tier management technique, a storage region in a virtual logical volume (hereinafter referred to as a virtual volume) based on thin provisioning is divided into a plurality of partial regions (hereinafter referred to as virtual regions). Then, to which of the tiers a storage device including a substantive storage region (hereinafter referred to as an actual region) to be assigned belongs is determined for each virtual region. For example, according to Patent Literature 1, the storage region in a virtual volume and the storage region in a physical storage device are divided into at least two virtual regions and at least two actual regions, respectively. One actual region is assigned to each virtual region. Furthermore, for each actual region, the number of accesses from a host computer and the allowable range of the access count are recorded. Data in an actual region with the access count exceeding the allowable range is migrated to another actual region in the storage device in accordance with the access status.

CITATION LIST

Patent Literature

Patent Literature 1: U.S. Patent Publication No. 2007/0283079

SUMMARY OF INVENTION

Technical Problem

In the technique described in Patent Literature 1, a device with characteristics suitable for storage of the data is determined based on the past access history of the data. The data is migrated to the determined device.

However, such a conventional storage tier management technique as described in Patent Literature 1 migrates the data simply based on the access count. It is thus difficult to efficiently migrate the data taking into account the time required for the data migration or costs represented by performance loads.

The present invention has been made in view of these circumstances. An object of the present invention is to provide a technique for achieving more efficient data migration.

Solution to Problem

In the present invention, to accomplish the above-described object, a management system acquires load lumped region variation information (the amount of variation in access distribution) indicative of a variation in the position (address or address range) of a virtual region in a virtual volume in a storage subsystem which position (address or address range) corresponds to a hot spot. Then, based on the load lumped region variation information, the management system determines a load position (address or address range) unvaried hour(s) indicative of a hour(s) in which the position (address or address range) of the virtual region corresponding to the hot spot remains unvaried (the hour(s) in which the position (address or address range) of the hot spot is stable). The management system then displays the hour(s) on a display device.

Further features of the present invention will be apparent from Description of Embodiments and the attached drawings.

Advantageous Effects of Invention

The present invention allows an administrator to determine (predict) the hour(s) in which the actual regions can be efficiently rearranged.

BRIEF DESCRIPTION OF DRAWINGS

FIG. 4 is a diagram showing an example of configuration of a RAID group management table 308.

FIG. 5 is a diagram showing an example of configuration of an actual region management table 309.

FIG. 11 is a diagram showing an example of configuration of a management-side RAID group management table 807.

FIG. 12 is a diagram showing an example of configuration of a management-side actual region management table 808.

FIG. 13 is diagram showing an example of configuration of a management-side VVOL management table 810 according to the first embodiment.

FIG. 22 is a diagram showing an example of configuration of a VVOL management table 311 according to a second embodiment.

FIG. 23 is a diagram showing an example of configuration of a management-side VVOL management table 810 according to the second embodiment.

DESCRIPTION OF EMBODIMENTS

Figure 1:
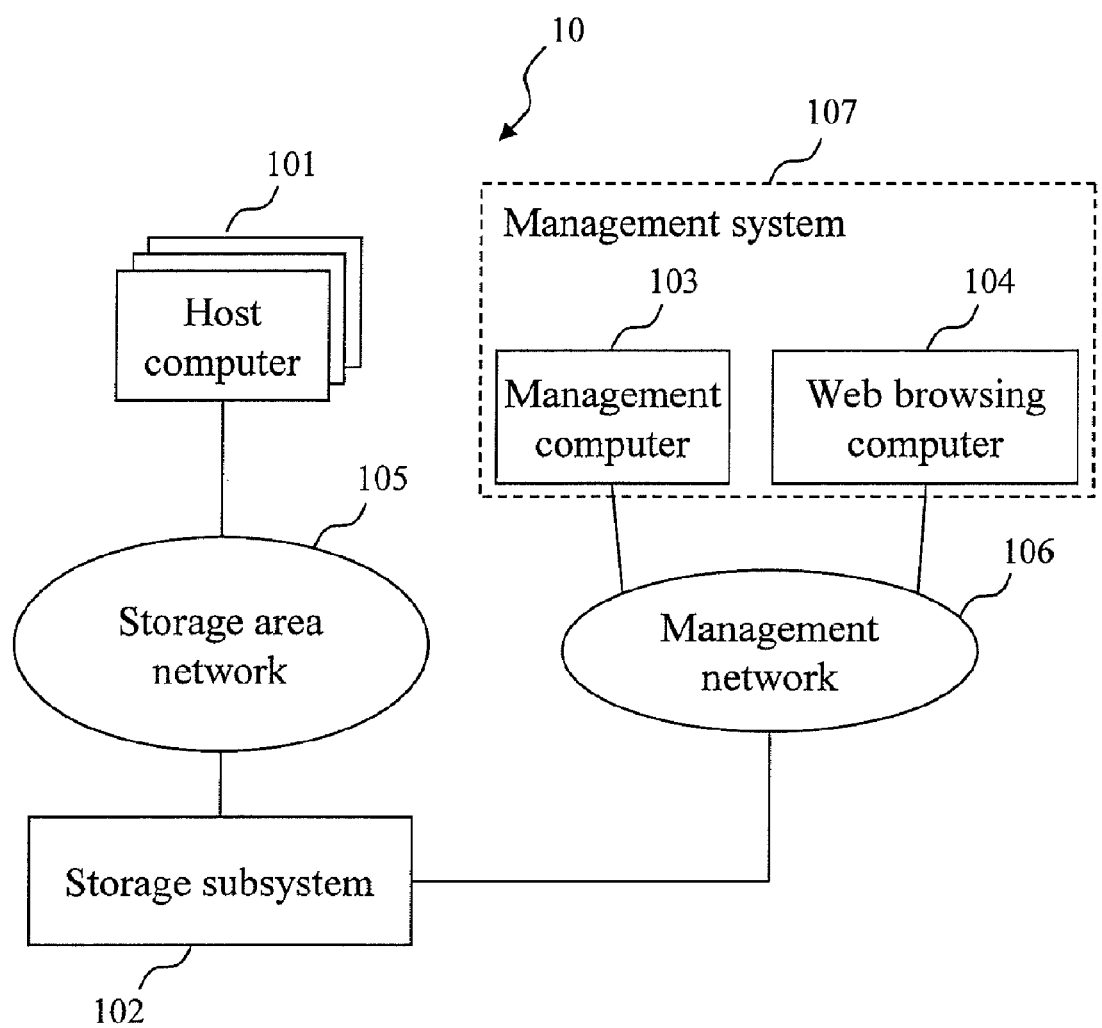
FIG. 1 is a diagram schematically showing the configuration of a computer system 10 according to an embodiment of the present invention.

The present invention relates to a technique for controlling a review hour(s) for assignment of a substantive storage region to virtual logical volumes based on thin provisioning. In the embodiments described below, for each virtual volume, data on the distribution of accesses from a host computer to virtual regions in the volume is collected. The values in the data are analyzed to determine, for each virtual volume, a hour(s) in which the access distribution remains unvaried. For each virtual volume, a process (hereinafter referred to as a rearrangement process) is carried out in which actual regions assigned to the virtual regions in the virtual volume are reviewed. Thus, simply by configuring a threshold for determining the hour(s) in which the access distribution for the virtual volume remains unvaried, the administrator of a computer system can limit the hour(s) for the rearrangement process to one that allows the effects of the rearrangement process to last long. Thus, the present invention can prevent degradation of capabilities and an increase in storage subsystem operation costs, both of which are associated with the ineffective rearrangement process. The embodiments of the present invention will be described below with reference to the attached drawings. However, it should be noted that the present embodiments are only examples of implementation of the present invention and are not intended to limit the technical scope of the present invention. Furthermore, components common to a number of the drawings are denoted by the same reference numerals.

In the description below, various pieces of information according to the present invention will be described using the expression "aaa table". However, these pieces of information need not necessarily be expressed in a tabular data structure but may be expressed in a data structure such as a list, a DB, or a queue, or any other structure. Thus, to indicate independence from the data structure, the "aaa table", "aaa list", "aaa DB", "aaa queue", and the like may be referred to as "aaa information".

Furthermore, to describe the contents of the information, the expressions "identification information", "identifier", "name", and "ID" may be used. The expressions are interchangeable.

Moreover, in the description below, the term "program" may be used as a subject. However, the program allows a processor to carry out specified processes using a memory and a communication port (communication controller). Thus, in the description, the processor may be a subject. Futheimore, processes disclosed using the term "program" as a subject may be carried out by a computer or an information processor such as a management server. Alternatively, a part or all of the program may be implemented by dedicated hardware or modularized. Various programs may be installed in each computer via a program distribution server or storage media.

(1) First Embodiment

<Brief Description of Characteristic Processes>

Before detailed description of the configuration and operation of a computer system according to the present embodiment, characteristic processes executed by the computer system will be described in brief. The computer system includes a storage subsystem, a host computer, and a management system. The management system manages the storage subsystem. The management system may be included in the storage subsystem or the host computer. The storage subsystem provides a pool and a plurality of virtual volumes.

The pool comprises a plurality of tiers. The tier is a set of actual regions with the same capability. The tier is defined, for example, by a particular value indicative of a capability and includes actual regions with the same capability as that indicated by the value. The tiers involve the concept of the relative height among the tiers. The height of the tier depends on the level of the capability thereof. The term "capability" as used herein refers to, for example, an access capability. The access capability includes, for example, a response time, a data transfer rate, or an IOPS (the number of access requests processed per unit time). An example of the access request is a write request or a read request.

Each tier comprises at least two actual regions. Thus, the pool comprises a plurality of actual regions. The actual region is a part of a storage region in a physical storage device or/and a RAID group. The capability of the tier depends on the capability of the actual regions included in the tier. The capability of the actual regions depends on, for example, the type of a physical storage device with the actual regions, the RAID level of the RAID group, and/or the number of storage devices participating in the RAID group. Examples of the type of the physical storage device include an SSD, an SAS-HDD, and an SATA-HDD.

The virtual volume comprises a plurality of virtual regions (virtual storage regions). At most one actual region is assigned to each virtual region. Avoiding the assignment of an actual region to a virtual region is possible. Upon receiving a write request for such a virtual region (unassigned virtual region) from a host computer, the storage subsystem assigns an actual region not assigned to any virtual region (unassigned actual region) to the virtual region.

Processes carried out according to the present embodiment will be described in brief. In the present embodiment, for example, (i) an access distribution variation amount calculation process, (ii) a rearrangement hour(s) calculation process, and (iii) a rearrangement process are carried out. The processes will be described below in detail.

(i) Access Distribution Variation Amount Calculation Process

The management system calculates and records the amount of variation in the access distribution in each virtual volume in the storage subsystem. Here, the access distribution of the virtual volume refers to a set of the numbers of accesses from the host computer to the virtual regions in the virtual volume. This indicates for what rate of the amount of accesses to the entire virtual volume the accesses to each virtual region account, thus, the position (address or address range) of a hot spot (frequently accessed virtual region) at a certain point in time. Furthermore, the amount of variation in the access distribution of the virtual volume is an index (load concentration region variation index) indicating how the position (address or address range) of the virtual region corresponding to the hot spot has varied over time within the virtual volume. For example, the expression "the access distribution variation amount is large" means that the accessed virtual region varies significantly within one virtual volume. The expression "the access distribution variation amount is small" means that the accessed virtual region varies insignificantly within one virtual volume regardless of the number of accesses (the position (address or address range) of the hot spot moves insignificantly).

The "number of accesses to the virtual region" refers to the number of access requests completely processed with all or a part of the target virtual region specified as an address range (or access requests completely processed and being processed). For example, if the address range of the access requests is a part or all of a certain virtual range (in other words, the virtual region includes the address range), the number of accesses to the virtual region is increased by the number of requests. In another example, if the address range of the access requests includes a part or all of the plural virtual regions, the number of accesses to each of the virtual regions is increased by the number of the requests. The latter case occurs infrequently if the virtual region has a large size. Thus, the count number for the virtual region including the head of the address range specified in the access request may be increased. The amount of variation in the access distribution of the virtual volume can be calculated based on, for example, information on the access distribution of the virtual volume obtained at a certain past time and the current information on the access distribution of the virtual volume. The management system, for example, periodically or repeatedly acquires information on the access distribution of each virtual volume from the storage subsystem (in the latter case, the acquisition need not be periodical, and acquisition time intervals may vary slightly). The management system then calculates the amount of variation in the access distribution of the virtual volume based on the current and last pieces of information acquired. The management system then records the calculated variation amounts in a time series manner. In this case, only the last piece of information on the access distribution of the virtual volume needs to be recorded. Thus, compared to time series recording of information on the access distribution of the virtual volume, the present embodiment enables a reduction in the size of a storage region required for the management system to record information used to calculate the amount of variation in access distribution.

(ii) Rearrangement Hour(s) Calculation Process

The management system analyzes the time series data on the amount of variation in the access distribution of each virtual volume. The management system calculates and records a hour(s) (hereinafter referred to as the rearrangement hour(s)) in which the status of assignment of actual regions to virtual regions in each virtual volume is reviewed. For example, for each virtual volume, the management system calculates the average value of the amounts of variation in access distribution in the hour(s)s corresponding to the respective hours of the day (for example, 9:00-10:00 and 10:00-11:00), based on the data on the amount of variation in the access distribution of the virtual volume obtained during the last week. The management system then records the hour(s) in which the average value is smaller than a certain threshold, as a rearrangement hour(s) for the virtual volume.

The present process is based on the following idea: in a hour(s) with a small amount of variation in the access distribution of the virtual volume, the status of accesses to the virtual regions in the virtual volume varies insignificantly, and the physical storage device or/and RAID group to be assigned to each virtual region is likely to be unvaried. Thus, when the status of assignment of the actual regions to the virtual regions in the virtual volume is reviewed at the beginning of the hour(s), it is likely that the assignment status need not be varied until the end of the hour(s).

The length of the hour(s) (in the above-described process, 1 hour), which is a unit for calculation of the average value of the amounts of variation in access distribution, may be, for example, 10 minutes or 3 hours. Furthermore, the period (in the above-described process, 1 week) over which the average value is calculated may be, for example, 3 days or 1 month. Moreover, the rearrangement hour(s) information may include, for example, information such as the date or the day of the week. If the information other than that on the hour(s) is included, the hour(s) information may be omitted. If the hour(s) information is omitted, the management system instructs the storage subsystem to carry out the rearrangement process at a particular time on the date or/and the day of the week indicated by the rearrangement hour(s).

(iii) Rearrangement Process

The rearrangement hour(s) calculation process allows determination of the hour(s) in which the hot spot moves insignificantly (makes almost no movement) but fails to determine the position (address or address range) of the hot spot during the hour(s). Carrying out the rearrangement process in accordance with the position (address or address range) of the hot spot requires the observation, for a given time, of the number of accesses to each virtual region during the hour(s).

Thus, a given time, for example, 30 minutes after the start time of the rearrangement hour(s) for the virtual volume calculated and recorded in the rearrangement hour(s) calculation process, the management system reviews the status of assignment of the actual regions to the virtual regions in the virtual volume. For example, for each virtual region in the virtual volume, the management system determines whether or not the number of accesses to the virtual region exceeds the access count range corresponding to the tier with the actual region assigned to the virtual region. For each virtual region determined to have an access count exceeding the range, the management system assigns an actual region (hereinafter referred to as the migration destination actual region) in the tier which corresponds to an access count range that accommodates the number of accesses to the virtual region, instead of the actual region (hereinafter referred to as the migration source actual region) previously assigned to the virtual region. Specifically, the management system instructs the storage subsystem to migrate the data in the migration source actual region to the migration destination actual region.

<Configuration of the Computer System>

FIG. 1 is a diagram schematically showing the configuration of a computer system 10 according to the embodiment of the present invention. In the computer system 10, a host computer 101 and a storage subsystem 102 are connected together by a storage area network 105. Furthermore, a management system 107 is connected to the storage subsystem 102 by a management network 106. The management system 107 and the host computer 101 may be connected together by the management network 106. The management system 107 includes a management computer 103 and a Web browsing computer 104.

The management computer 103 and the Web browsing computer 104 may be the same or may each comprise a plurality of computers to provide similar functions. That is, a set of at least one computer configured to manage the computer system 10 and to show display information according to the present information may be referred to as a management system. The management computer 103 showing display information may serve as a management system or a combination of the management computer 103 and the display computer (Web browsing computer) 104 may serve as a management system 107 as shown in FIG. 1. Alternatively, in order to increase the speed and reliability of the management process, a plurality of computers may be used to achieve processing similar to that carried out by the management computer. In this case, the plurality of computers (including the display computer if the display process is carried out by the display computer) correspond to a management system.

Furthermore, the storage area network 105 and the management network 106 may be the same.

The host computer 101 transmits an access request to the storage subsystem 102. The storage subsystem 102 receives the access request from the host computer 101 via the storage area network 105, to process the access request.

The management system 107 transmits a control request (for example, a request for execution of the rearrangement process) to the storage subsystem 102. The storage subsystem 102 receives the control request from the management system 107 via the management network 106, to carry out processing in accordance with the control request.

The computer system 10 may include a plurality of the host computers 101. Similarly, the computer system 10 may include a plurality of storage subsystems 102.

<Configuration of the Host Computer>

Figure 2:
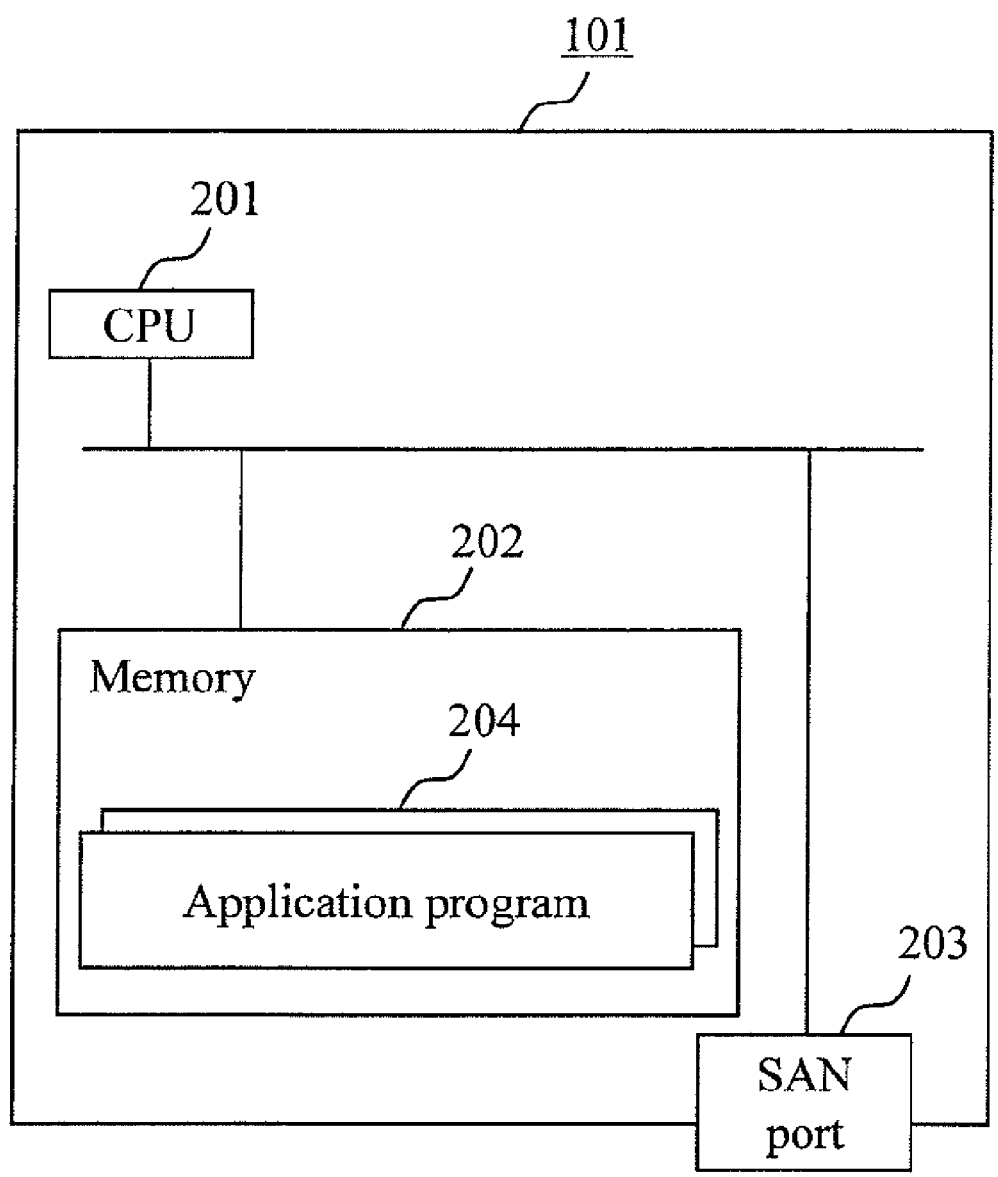
FIG. 2 is a block diagram showing the internal configuration of a host computer 101.

FIG. 2 is a block diagram showing the internal configuration of the host computer 101. The host computer 101 includes a SAN port 203 configured to implement a connection to the storage area network 105, a memory 202, and a CPU 201 connected to the memory 202 and the SAN port 203.

The SAN port 203 is connected to the storage area network 105.

At least one application program 204 is stored in the memory 202. Each application program 204 is executed by the CPU 201 to transmit an access request to the storage subsystem 102 via the SAN port 203 and the storage area network 105.

<Configuration of the Storage Subsystem>

Figure 3:
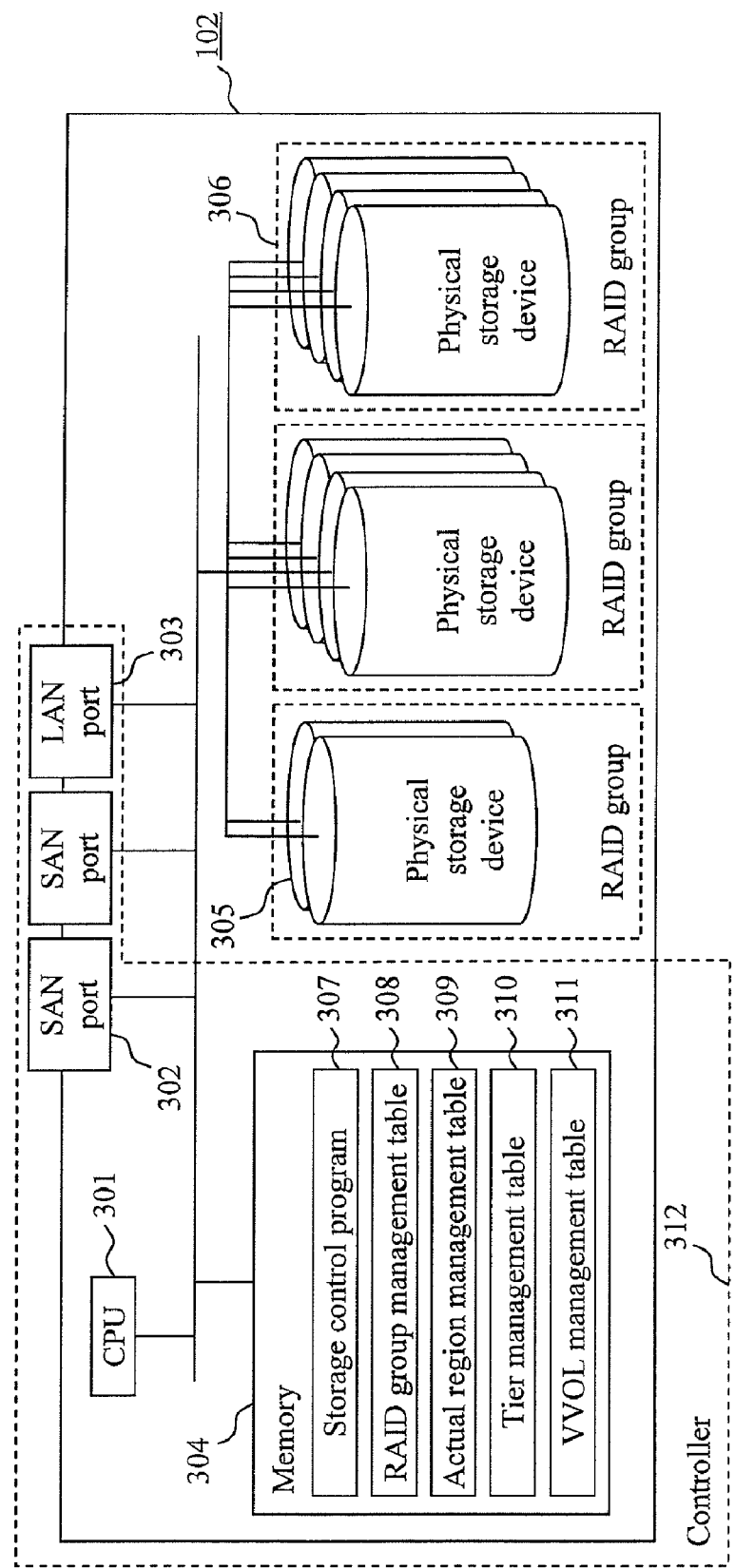
FIG. 3 is a block diagram showing the internal configuration of a storage subsystem 102.

FIG. 3 is a block diagram showing the internal configuration of the storage subsystem 102. The storage subsystem 102 includes a plurality of physical storage devices 305 with different capabilities, and a controller 312; the physical storage devices 305 and the controller 312 are connected together via a circuit such as an internal bus. If a plurality of physical storage devices 305 of the same type are provided, the physical storage devices 305 may be combined together into a RAID configuration. The plurality of physical storage devices 305 combined into the RAID configuration are included in a RAID group 306.

The controller 312 includes a SAN port 302 for connection to the storage area network 105, a LAN port 303 for connection to the management network 106, a memory 304, and a CPU 301 connected to the ports 302 and 303 and the memory 304.

The SAN port 302 is connected to the storage area network 105. The SAN port 302 receives access requests from the host computer 101.

The LAN port 303 is connected to the management network 106. The LAN port 303 receives control requests from the management system 107.

A storage control program 307, a RAID group management table 308, an actual region management table 309, a tier management table 310, and a VVOL management table 311 are stored in the memory 304. The storage control program 307 is executed by the CPU 301 to carry out the access control process and rearrangement process.

<RAID Group Management Table 308>

FIG. 4 is a diagram showing the configuration of the RAID group management table 308 provided in the storage subsystem 102. The RAID group management table 308 contains information on the capabilities of the RAID group 306.

For example, the RAID group management table contains, as component items, a RAID group ID 401 indicative of the identifier of a RAID group, a device type 402 indicative of the type of physical storage devices included in the RAID group, a RAID level 403 indicative of the RAID level and combination of the RAID group, and a PDEV_ID 404 indicative of identifiers of the physical storage devices included in the RAID group. Instead of at least one of the pieces of information 401 to 404 or in addition to the pieces of information 401 to 404, another type of information may be contained in the table.

<Actual Region Management Table 309>

FIG. 5 is a diagram showing the configuration of the actual region management table 309 provided in the storage subsystem 102. The actual region management table 309 contains information indicating whether or not the actual region of each RAID group 306 has already been assigned to any virtual volume.

For example, the actual region management table 309 contains, as component items, a RAID group ID 501 indicative of the identifier of a RAID group with actual regions, an actual region ID 502 indicative of the identifiers of the actual regions, an RG_LBA range 503 indicative of LBA ranges in the RAID group corresponding to the respective actual regions, and an assignment status 504 indicating whether or not each of the actual regions has already been assigned.

<VVOL (Virtual Volume>Management Table 311>

Figure 6:
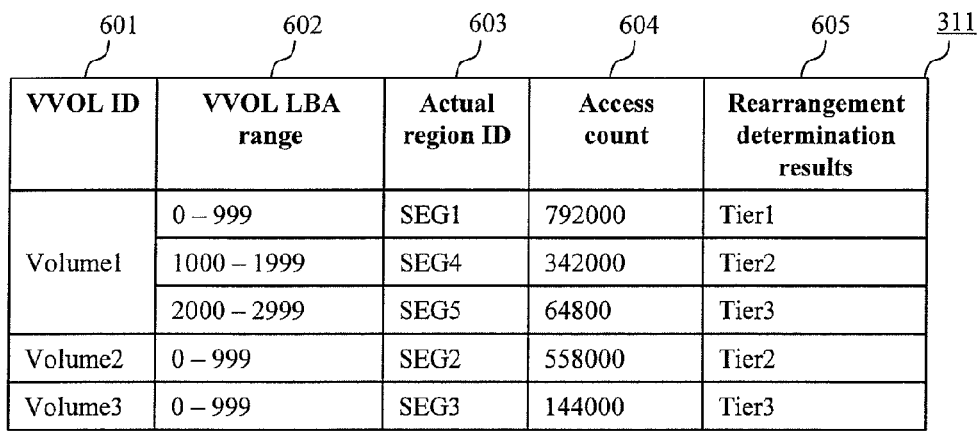
FIG. 6 is a diagram showing an example of configuration of a VVOL management table 311 according to a first embodiment.

FIG. 6 is a diagram showing the configuration of the VVOL management table 311 provided in the storage subsystem 102. The VVOL management table 311 contains information on each of the virtual regions in the virtual volume and on the actual region assigned to the virtual region.

For example, the VVOL management table 311 contains, as component items, a VVOL_ID 601 indicative of the identifiers of virtual volumes, a VVOL_LBA range 602 indicative of LBA ranges in the virtual volume corresponding to the respective virtual regions, an actual region ID 603 indicative of the actual regions assigned to the virtual regions in the virtual volume, an access count 604 indicative of the number of accesses (the accumulated number of I/Os) from the host computer to each of the virtual regions in the virtual volume, and rearrangement determination results 605 indicating the identifiers of tiers each determined in the rearrangement process to include an actual region to be assigned to the corresponding virtual region in the virtual volume.

In the VVOL management table 311, the VVOL_ID 601 is not specified by the host computer 101 but is recognized inside the storage subsystem 102. The access count 604 corresponds to the value of the number of accesses to the virtual region. The storage subsystem 102 resets the value of the access count 604 to zero every given period, for example, every 24 hours. Furthermore, for example, determination results for a recently executed rearrangement process are stored in the rearrangement determination results 605.

<Tier Definition Table 310>

Figure 7:
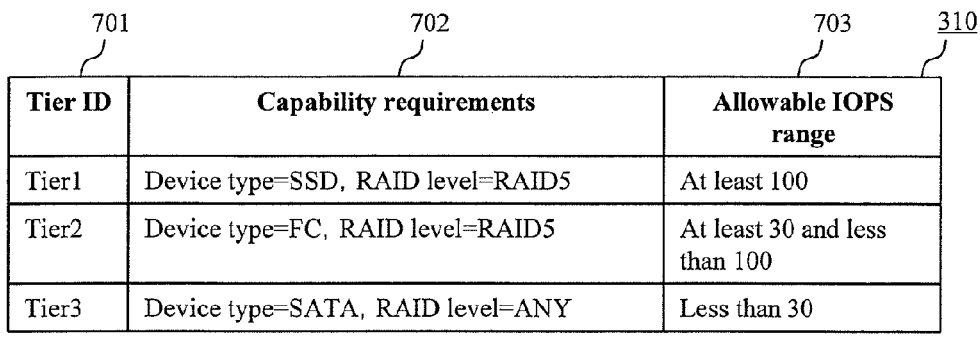
FIG. 7 is a diagram showing an example of configuration of a tier definition table 310.

FIG. 7 is a diagram showing the configuration of the tier definition table 310 provided in the storage subsystem 102. The tier definition table 310 contains information on the capabilities of the tiers and on the allowable ranges of the access count.

For example, the tier definition table 310 contains, as component items, a tier ID 701 indicative of the identifier of each tier, capability requirements 702 indicative of capability requirements for the tier, and an allowable IOPS range 703 indicative of the allowable range of the access count per unit time which range corresponds to the tier. In the tier definition table 310, the tier capability requirement 702 is defined by, for example, the type of physical storage devices and the RAID level of the RAID group.

Each tier 701 identified by the tier ID has the actual regions belonging to the physical storage devices or/and the RAID group meeting the capability requirements 702. The tier definition table 310 is updated in response to, for example, the storage administrator's request.

<Configuration of the Management Computer>

Figure 8:
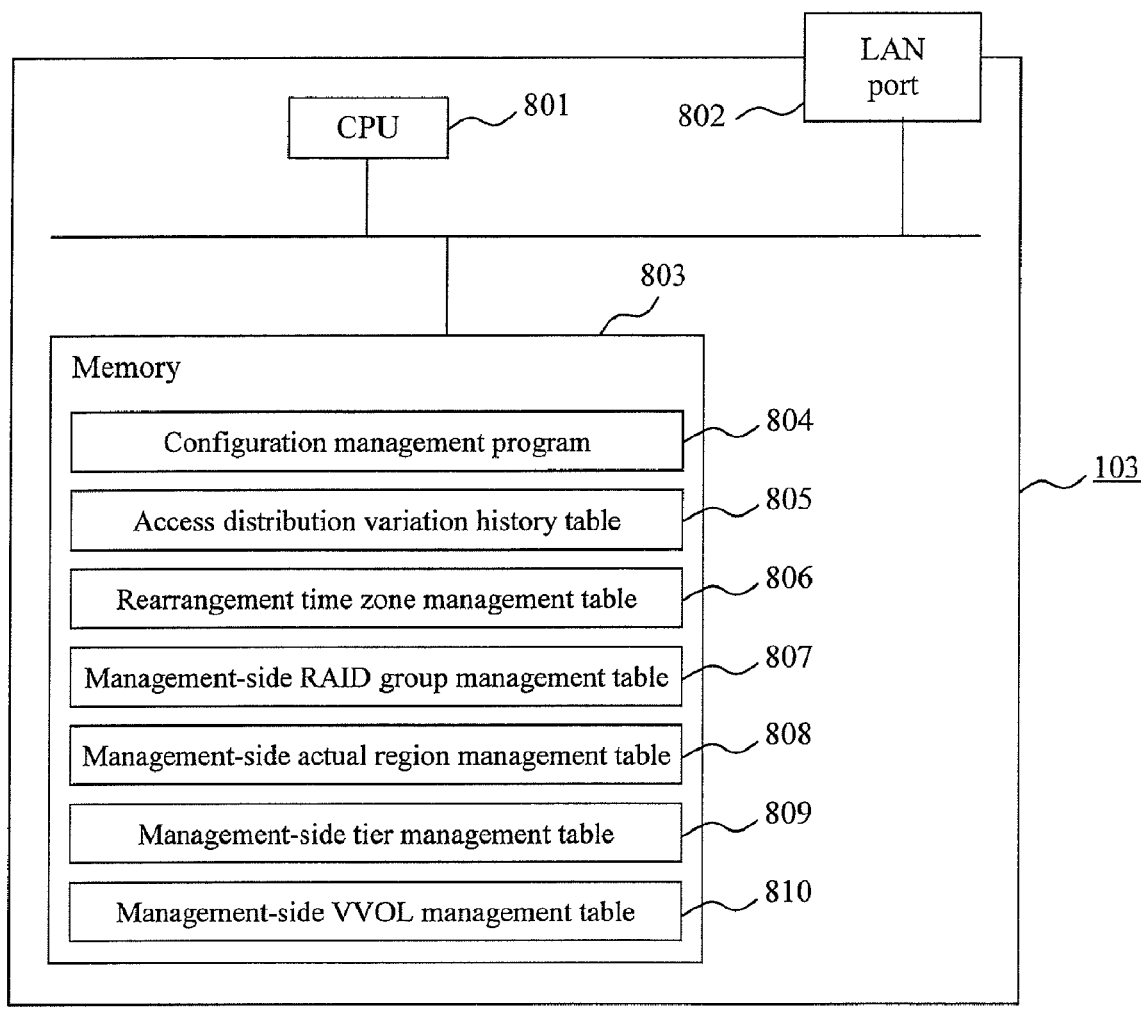
FIG. 8 is a block diagram showing the internal configuration of a management computer 103.

FIG. 8 is a block diagram showing the internal configuration of the management computer 103. The management computer 103 includes a LAN port 802 for connection to the management network 106, a CPU 801 configured to execute a configuration management program 804, and a memory 803 used by the CPU 801. The LAN port 802, the CPU 801, and the memory 803 are connected together via a circuit such as an internal bus.

The following are stored in the memory 803: a configuration management program 804, an access distribution variation history table 805, a rearrangement hour(s) management table 806, a management-side RAID group management table 807, a management-side actual region management table 808, a management-side tier management table 809, and a management-side VVOL management table 810.

The management tables 807 to 810 correspond to the management tables 308 to 311 for the storage subsystem 102. The management tables 807 to 810 are used to store configuration information obtained by the management computer 103 from the storage subsystem 102.

The configuration management program 804 is executed by the CPU 801 to carry out the following processing. That is, the configuration management program 804 periodically or repeatedly acquires, from the storage subsystem 102, information contained in the tables 308 to 311. Based on the information acquired, the configuration management program 804 updates the access distribution variation history table 805. Furthermore, the configuration management program 804 periodically or repeatedly carries out a rearrangement hour(s) calculation process based on the access distribution variation history table 805. Then, the configuration management program 804 reflects the results of the calculation in the rearrangement hour(s) management table 806 after presenting the results to the user (for example, the administrator) and then receiving the user's acceptance or without presenting the results to the user. The information acquisition process and the rearrangement hour(s) calculation process need not necessarily be carried out at equal time intervals. The time intervals may vary slightly provided that the processes are repeated. Moreover, the configuration management program 804 carries out the rearrangement process on each virtual volume every time the rearrangement hour(s) described in the rearrangement hour(s) management table 806 and corresponding to the virtual volume is started.

<Access Distribution Variation History Table 805>

Figure 9:
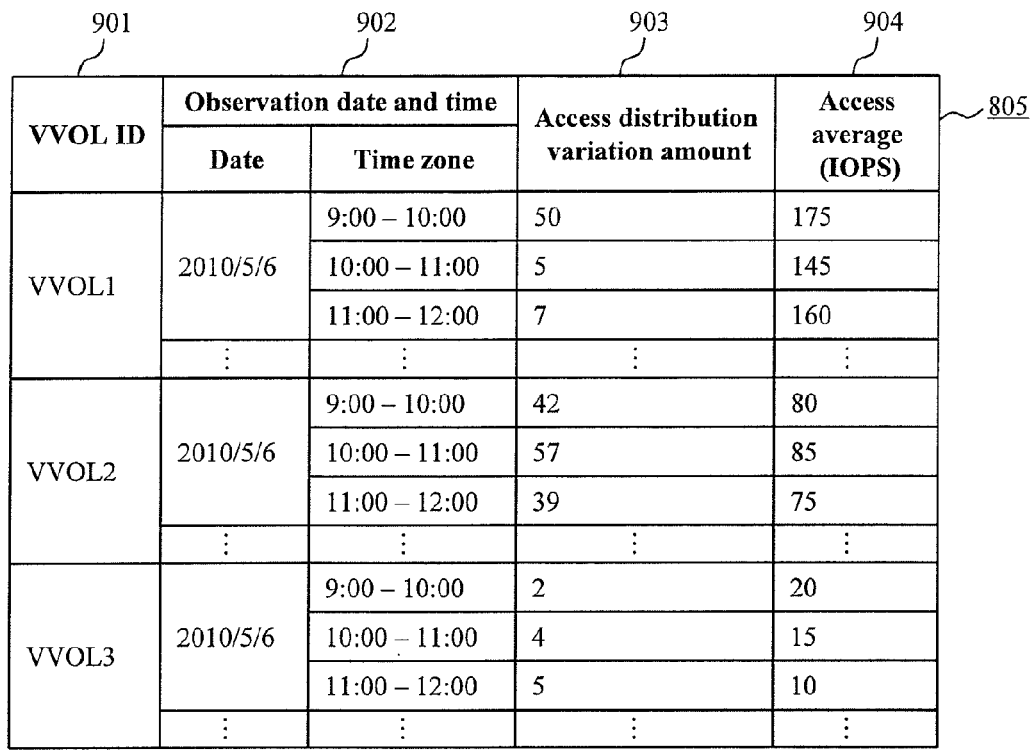
FIG. 9 is a diagram showing an example of configuration of an access distribution variation history table 805.

FIG. 9 is a diagram showing the configuration of the access distribution variation history table 805 provided in the management computer 103. The access distribution variation history table 805 contains time series information on the amount of variation in access distribution for each virtual volume.

For example, the access distribution variation history table 805 contains, as component items a VVOL_ID 901 indicative of the identifiers of the virtual volumes, an observation time 902 indicative of the hour(s)s in which the amount of variation in the access distribution of each virtual volume was observed, an access distribution variation amount 903 indicative of the amounts of variation in the access distribution of the virtual volume, and an access average 904 indicative of the average value of the numbers of accesses from the host computer to the virtual volume. The observation time is expressed by, for example, a set of the date and hour(s). Furthermore, the unit of the access average 904 is, for example, IOPS (the number of accesses (I/Os) per second). The calculation of the access distribution variation amount 903 will be described below with reference to FIG. 17.

<Arrangement Hour(s) Management Table 806>

Figure 10:
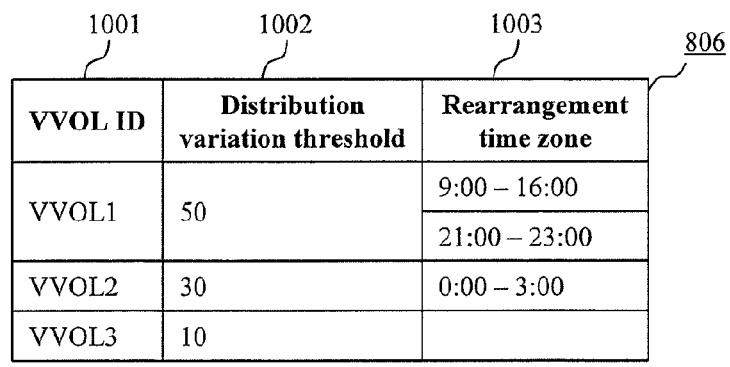
FIG. 10 is a diagram showing an example of configuration of a rearrangement hour(s) management table 806.

FIG. 10 is a diagram showing the configuration of the rearrangement hour(s) management table 806. The rearrangement hour(s) management table 806 contains, for each virtual volume, information on the hour(s) in which the rearrangement process is carried out on the virtual volume.

For example, the rearrangement hour(s) management table 806 contains, as component items, a VVOL_ID 1001 indicative of the identifiers of the virtual volumes, a distribution variation threshold 1002 indicative of a threshold for the amount of variation in the access distribution of each virtual volume in order to allow determination of the hour(s) in which the rearrangement process is to be carried out on the virtual volume, and a rearrangement hour(s) 1003 indicative of the hour(s) in which the hot spot moves insignificantly and in which the rearrangement process is to be carried out on the virtual volume.

<Management-Side RAID Group Management Table 807>

FIG. 11 is a diagram showing the configuration of the management-side RAID group management table 807 provided in the management computer 103. The management-side RAID group management table 807 corresponds to the RAID group management table 308 provided in the storage subsystem 102. The management-side RAID group management table 807 is used to store information contained in the RAID group management table 308. However, the information contained in the management-side RAID group management table 807 need not be perfectly equal to the information provided in the RAID group management table 308. Part of the information in the RAID group management table 308 may avoid being stored in the management-side RAID group management table 807.

For example, the management-side RAID group management table 807 contains, as component items, a RAID group ID 1101 indicative of the identifiers of the RAID groups, a device type 1102 indicative of the type of the physical storage devices included in each RAID group, and a RAID level 1103 indicative of the RAID level and combination of the RAID group.

The information contained in the tables 808 to 810 described below also need not be perfectly equal to that contained in the corresponding tables 309 to 311 in the storage subsystem 102.

<Management-Side Actual Region Management Table 808>

FIG. 12 is a diagram showing the configuration of the management-side actual region management table 808 provided in the management-side computer 103. The management-side actual region management table 808 corresponds to the actual region management table 309 provided in the storage subsystem 102.

For example, the management-side actual region management table 808 contains, as component items, a RAID group ID 1201 indicative of the identifiers of RAID groups with actual regions, an actual region ID 1202 indicative of the identifiers of the actual regions, an RG_LBA range 1203 indicative of the LBA ranges of the RAID groups corresponding to the respective actual regions, and an assignment status 1204 indicating whether or not each of the actual regions has already been assigned.

<Management-Side VVOL Management Table 810>

FIG. 13 is a diagram showing the configuration of the management-side VVOL management table 810 provided in the management-side computer 103. The management-side VVOL management table 810 corresponds to the VVOL management table 311 provided in the storage subsystem 102.

For example, the management-side VVOL management table 810 contains, as component items, a VVOL_ID 1301 indicative of the identifiers of the virtual volumes, a VVOL_LBA range 1302 indicative of the LBA ranges in the virtual volume corresponding to the respective virtual regions, an actual region ID 1303 indicative of the actual regions assigned to the virtual regions in the virtual volume, an access count 1304 indicative of the number of accesses from the host computer to each of the virtual regions in the virtual volume, and rearrangement determination results 1305 indicative of the identifiers of tiers each determined in the rearrangement process to include an actual region to be assigned to the corresponding virtual region in the virtual volume.

The number of accesses to the virtual region is recorded in the access count 604 in the VVOL management table 311. However, values related to the access count and used in the processes carried out by the management computer 103 are recorded in the access count 1304 in the management-side VVOL management table 810. For example, the access count 1304 may include the value (last-process access count) 1306 of the access count 604 obtained during the last access distribution variation amount calculation process and used for the access distribution variation amount calculation process, as well as the average value (last-process average value) 1307 of the numbers of accesses to the virtual region calculated during the last process. Moreover, the access count 1304 may include, for example, the value (the access count at the start time) 1308 of the access count obtained at the start time of the rearrangement hour(s) and used for the rearrangement process, as well as the average value (average value) 1309 of the numbers of accesses to the virtual region calculated during the rearrangement process. In this case, the unit for 1307 and 1309, which are indicative of the average value of access counts, is for example, the IOPS.

Furthermore, for example, if a measurement period for calculating an average value to be recorded in the column 1307 is equal to a measurement period for calculating an average value to be recorded in the column 1309, one of the columns 1306 and 1308 and one of the columns 1307 and 1309 may be omitted. Moreover, as values used for the access distribution variation amount calculation process, instead of or in addition to the column 1306 or/and column 1307, other values may be recorded. Additionally, as values used for the rearrangement process, instead of or in addition to the column 1308 or/and column 1309, other values may be recorded.

<Management-Side Tier Definition Table 809>

Figures 14, 15:
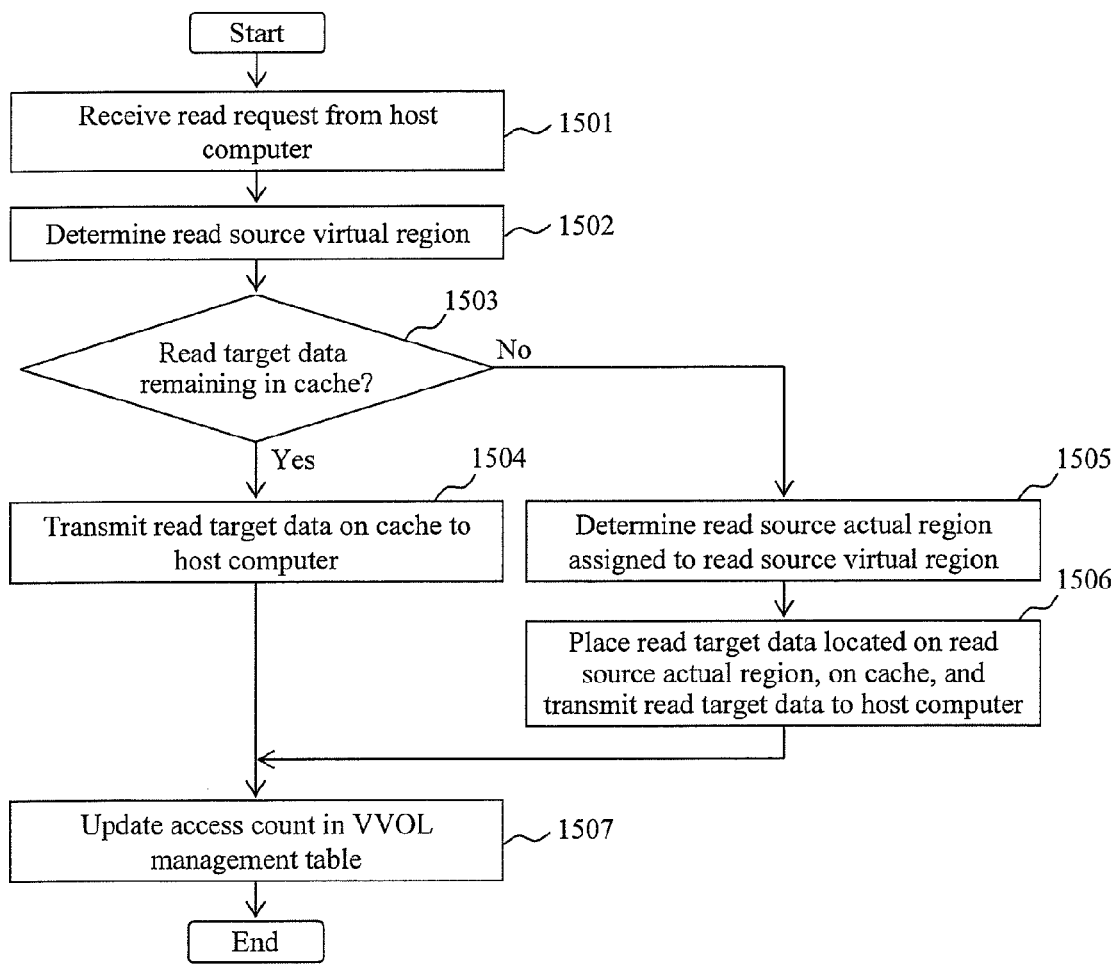
FIG. 14 is a diagram showing an example of configuration of a management-side tier definition table 809.
FIG. 15 is a flowchart illustrating a process corresponding to a read request.

FIG. 14 is a diagram showing the configuration of the management-side tier definition table 809 provided in the management-side computer 103. The management-side tier definition table 809 corresponds to the tier definition table 310 (FIG. 7) provided in the storage subsystem 102. The information in FIG. 14 may be defined by the administrator but needs to synchronize with the information in FIG. 7.

For example, the tier definition table 809 contains, as component items, a tier ID 1401 indicative of the identifier of each tier, capability requirements 1402 indicative of capability requirements for the tier, and an allowable IOPS range 1403 indicating the allowable range of the access count per unit time and corresponding to the tier.

<Contents of Processing in the Computer System>

The storage subsystem 102 according to the present embodiment carries out a (i) read process, a (ii) write process, and an (iii) access count calculation process. Furthermore, the management computer 103 according to the present embodiment carries out an (iv) access distribution variation amount calculation process, a (v) rearrangement hour(s) calculation process, and a (vi) rearrangement process. These processes will be described below in detail.

(A) Processing in the Storage Subsystem 102

For the read process, the write process, and the access count calculation process following completion of the read or write process, the host computer 101 transmits an access request to the storage subsystem 102 in order to access data recorded in the storage subsystem 102. The storage subsystem 102 receives the access request from the host computer 101 to carry out a process corresponding to the received request. Description will be given of a process carried out when a read request, an example of an access request, is received and a process carried out when a write request, an example of an access request, is received. The (iii) access count calculation process is included in each of the (i) read process and (ii) write process as the last part thereof.

(i) Read Process

FIG. 15 is a flowchart illustrating the read process in the storage subsystem 102. If the host computer 101 transmits a read request, for example, the following process is carried out.

The storage control program 307 receives the read request from the host computer 101 (step 1501). Then, the storage control program 307 determines the source virtual region (hereinafter referred to as the read source virtual region) from which the data is to be read, based on access destination information in the read request (step 1502).

Then, the storage control program 307 determines whether or not the data to be read remains in a cache memory region (step 1503).

If the target data remains in the cache (Yes in step 1503), the storage control program 307 transmits the read target data in the cache memory region to the host computer 101 (step 1504).

If no target data remains in the cache (No in step 1503), the storage control program 307 determines an actual region (hereinafter referred to as a read source actual region) assigned to the read source virtual region determined in 1502 based on the VVOL management table 311 (step 1505). Subsequently, the storage control program 307 reads the data from the read source actual region and writes the data to the cache memory region. The storage control program 307 also transmits the data to the host computer 101 (step 1506).

Finally, the storage control program 307 updates the value of the access count 604 corresponding to the read source virtual region (step 1507). At this time, if the operation performed immediately before step 1507 is step 1504, the storage control program 307 need not update the value of the access count 604 corresponding to the read source virtual region.

(ii) Write Process

Figure 16:
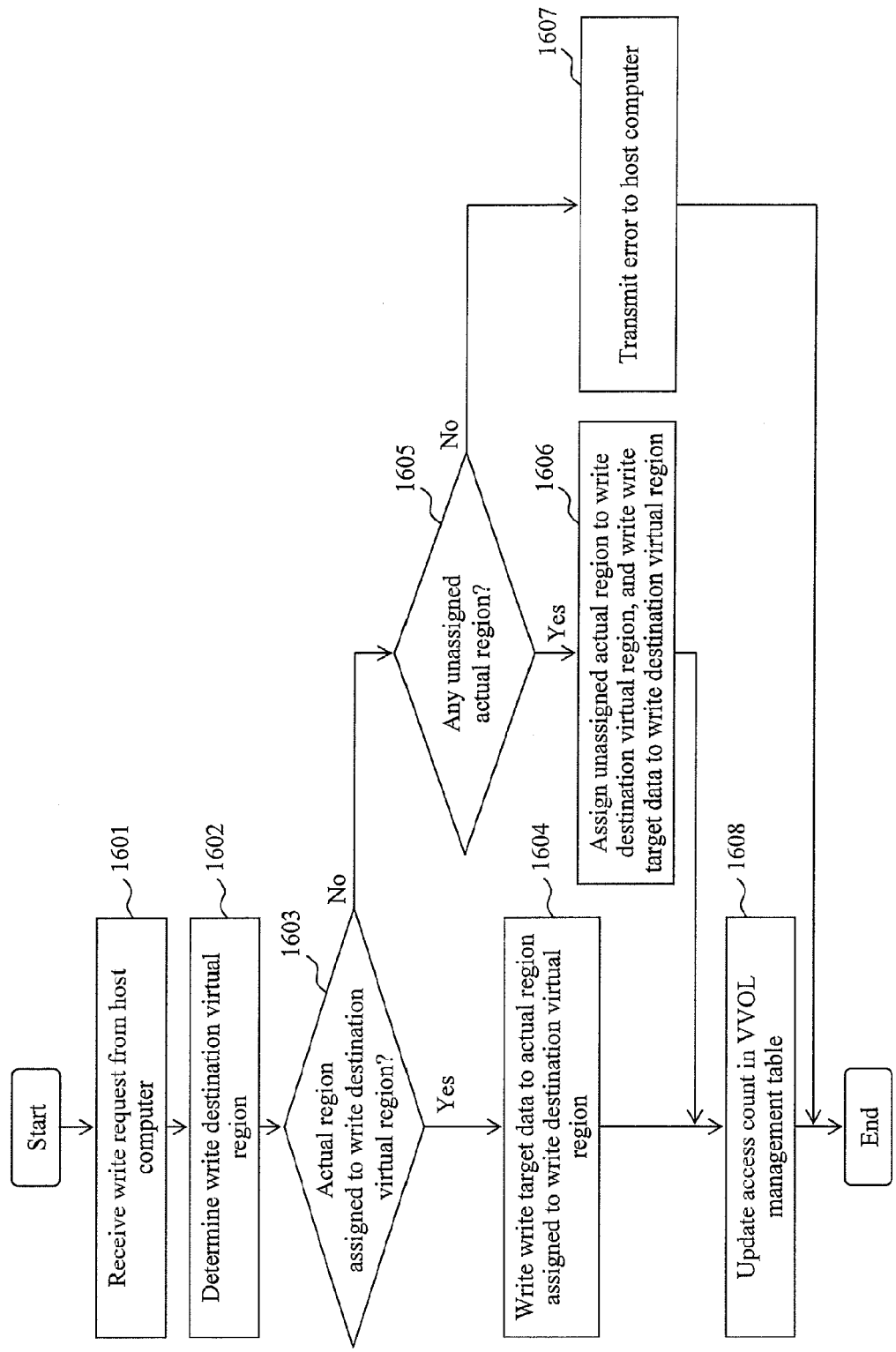
FIG. 16 is a flowchart illustrating a process corresponding to a write request.

FIG. 16 is a flowchart illustrating the write process in the storage subsystem 102. If the host computer 101 transmits a write request, for example, the following process is carried out.

The storage control program 307 receives the write request from the host computer 101 (step 1601). Then, the storage control program 307 determines a destination virtual region (hereinafter the write destination virtual region) to which the data is to be written, based on access destination information contained in the write request (step 1602).

Then, the storage control program 307 determines whether or not any actual region has been assigned to the write destination virtual region (step 1603). Specifically, the storage control program 307 determines whether or not the write destination virtual region has been registered in the VVOL management table 311.

If any actual region has been assigned to the write destination virtual region (Yes in step 1603), the storage control program 307 writes the write target data to the actual region assigned to the write destination virtual region (step 1604).

If no actual region has been assigned to the write destination virtual region (No in step 1603), the storage control program 307 determines whether or not there is any unassigned actual region available for assignment to the write destination virtual region (step 1605). Specifically, the storage control program 307 determines whether or not there is any actual region for which the assignment status 504 in the actual region management table 309 is "unassigned".

If there is any unassigned actual region available for assignment to the write destination virtual region (Yes in step 1605), the storage control program 307 assigns the unassigned actual region to the write destination virtual region. The storage control program 307 then writes the write target data to the actual region (step 1606).

If there is no unassigned actual region available for assignment to the write destination virtual region (No in step 1605), the storage control program 307 transmits an error to the host computer 101 (step 1607).

Finally, the storage control program 307 updates the value of the access count 604 corresponding to the write source virtual region (step 1608).

(B) Processing in the Management Computer 103

(iv) Access Distribution Variation Amount Calculation Process

Figure 17:
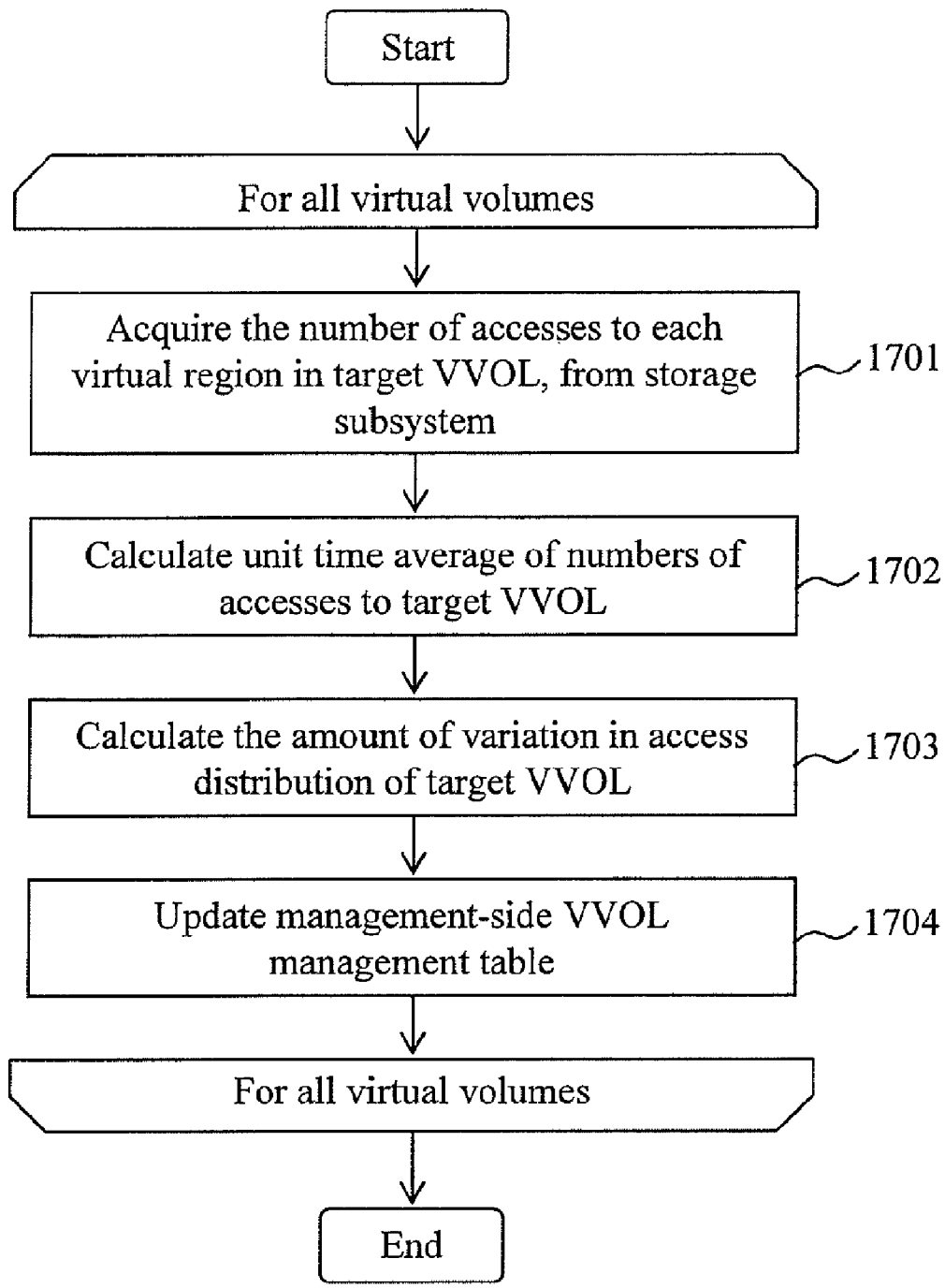
FIG. 17 is a flowchart illustrating an access distribution variation amount calculation process.

FIG. 17 is a flowchart illustrating the access distribution variation amount calculation process in detail. The access distribution variation amount calculation process is periodically or repeatedly carried out at given time intervals, for example, every hour. The time intervals need not be precise but may vary slightly.

The configuration management program 804 carries out the processing in the subsequent steps 1701 and 1704 on all the virtual volumes registered in the management-side VVOL management table 810. The process will be described below taking one virtual volume (referred to as the "target VVOL" in the description of FIG. 17) by way of example.

(Contents of the Processing in Step 1701)

The configuration management program 804 acquires the information on the access count corresponding to each of the virtual regions in the target VVOL, from the storage subsystem 102. Specifically, the configuration management program 804 transmits a request for information on the access count corresponding to each of the virtual regions in the target VVOL, to the storage subsystem 102. The request contains, for example, information on the VVOL_ID that is the identifier of the target VVOL.

The storage subsystem 102 receives the request and for each of the virtual regions in the virtual volume determined by the VVOL_ID contained in the request, the storage subsystem 102 transmits, for example, a set of the value of the VVOL_LBA range 602 corresponding to the virtual region and contained in the VVOL management table 311 and the value of the access count 604, to the management computer 103. At this time, the information transmitted to the management computer 103 by the storage subsystem 102 may be in any format provided that the correspondence between the identification information and access count information on the virtual region is known.

(Contents of the Processing in Step 1702)

The configuration management program 804 calculates the average value (IOPS) of the numbers of accesses to the target VVOL over a period from the end of the last process until the current time. Specifically, for each of all the virtual regions in the target VVOL, the configuration management program 804 determines the difference between the value of the access count 604 obtained in step 1701 and the value of the last-process access count 1306. The configuration management program 804 further calculates the sum of such difference values. The difference is determined because the present embodiment uses an increment counter to count the number of accesses. The sum of the differences allows the total number (accumulated value) of accesses during the period to be calculated. However, it is assumed that the access count 604 of each virtual region acquired during the last access distribution variation amount calculation process is recorded in the last-process access count 1306.

Based on the value of the calculated sum, the configuration management program 804 determines the unit-time average value (for example, the IOPS) of the numbers of accesses to the target VVOL over a period from the end of the last period until the current time (the value will be referred to as the "VVOL access average" in the description of FIG. 17).

(Contents of the Processing in Step 1703)

The configuration management program 804 calculates the amount of variation in the distribution of accesses to the target VVOL, during a period from the end of the last process until the current time. Specifically, first, for each of all the virtual regions in the target VVOL, the configuration management program 804 determines the unit-time average (for example, the IOPS) of the numbers of accesses to the virtual region over a period from the end of the last process until the current time, based on the difference between the value of the access count 604 acquired in step 1701 and the last-process access count 1306 (the average will be referred to as the "virtual region access average" in the description of FIG. 17).

Then, for each of all the virtual regions in the target VVOL, the configuration management program 804 calculates the difference between a value obtained by dividing the virtual region access average of the virtual region by the VVOL access average and a value obtained by dividing the last-process average value 1307 for the virtual region by the access average 904 for the target VVOL. However, it is assumed that the value of the virtual region access average calculated during the last process is recorded in the last-process average value 1307. The calculated difference value indicates how much the ratio of the number of accesses to the virtual region to the number of accesses to the target VVOL has changed since the end of the last process.

The configuration management program 804 calculates the square root of the square sum of the differences for all the virtual regions in the target VVOL to be the access distribution variation amount 903 corresponding to the target VVOL. The configuration management program 804 records the access distribution variation amount 903 in the access distribution variation history table 805. At this time, a hour(s) from the time when the last access distribution variation amount calculation process was carried out until the current time is recorded in the observation date and time 902 in the access distribution variation history table 805. Furthermore, the VVOL access average calculated in step 1702 is recorded in the access average 904 in the access distribution variation history table 805.

A variation in the position (address or address range) of the hot spot (which has an access count larger than those of the other virtual regions in the same virtual volume) in the target VVOL during the hour(s) can be detected by analyzing the value of the access distribution variation amount 903 calculated during the above-described process.

Here, in connection with "information that can be detected by analyzing the index", the access distribution variation amount, which is the calculated value of the above-described process, is compared with other indices. For example, if the number of accesses to the target VVOL is used as an index, the numbers of accesses to the individual virtual regions are not indicated by the index. This prevents detecting of the case in which "although the number of accesses to the target VVOL remains unvaried, the position (address or address range) of the hot spot in the target VVOL has varied". To allow a variation in the position (address or address range) of the hot spot to be detected, a variation in the distribution of accesses to the target VVOL may be noted. Thus, the differences among the numbers of accesses to the virtual regions in the target VVOL may be determined so that the resultant statistical value can be used as an index. However, this value allows detecting not only of a variation in the position (address or address range) of the hot spot but also of the case in which "the numbers of accesses to the virtual regions in the target VVOL have increased averagely" (this will be referred to as the "whole increase case" in the description of FIG. 17).

The present invention achieves the optimum assignment of an actual region to each of the virtual regions in each virtual volume and is not a solution for the whole increase case. Thus, the case of a variation in the position (address or address range) of the hot spot needs to be separated from the whole increase case. Thus, a statistical value such as the calculated value of the above-described process which is obtained by normalizing the numbers of accesses to the virtual regions in the target VVOL is used as an index. The normalization prevents the index from varying in the whole increase case, which is thus precluded from being detected. This allows the detecting to focus on a variation in the position (address or address range) of the hot spot.

The appropriate solution for the whole increase case is the conventional rearrangement process periodically carried out all across the virtual volumes (in units of pools). A combination of the present invention with the conventional art allows more effective utilization of the rearrangement process in regional units smaller than logical volumes. However, if the present invention is combined with the conventional art, the following control is required in order to avoid overlapping of the times when the rearrangement is performed: for example, within a given period (for example, one hour) from the end of a rearrangement process, execution of another rearrangement process is avoided, or priorities are determined for the rearrangement process according to the present patent and the rearrangement process according to the conventional art.

Furthermore, the above-described method for calculating the amount of variation in access distribution is illustrative, and any other calculation method may be used.

(Contents of the Processing in Step 1704)

For each of all the virtual regions in the target VVOL, the configuration management program 804 records the value of the access count 604 for the virtual region acquired in step 1701, in the column 1306. The configuration management program 804 records the value of the virtual region access average for the virtual region calculated in step 1703, in the column 1307.

If any of the virtual regions in the target VVOL is registered in the VVOL management table 311 in the storage subsystem 102 but not in the management-side VVOL management table 810, the configuration management program 804 performs the calculations in the processing between the above-described steps 1701 and 1703 with the values 1306 to 1309 for the access count for the virtual region specified, for example, as all zeros. Furthermore, in the processing in the above-described step 1704, the configuration management program 804 registers the virtual region in the management-side VVOL management table 810 and then updates the values in the corresponding columns 1306 and 1307.

(v) Rearrangement Hour(s) Calculation Process

Figure 18:
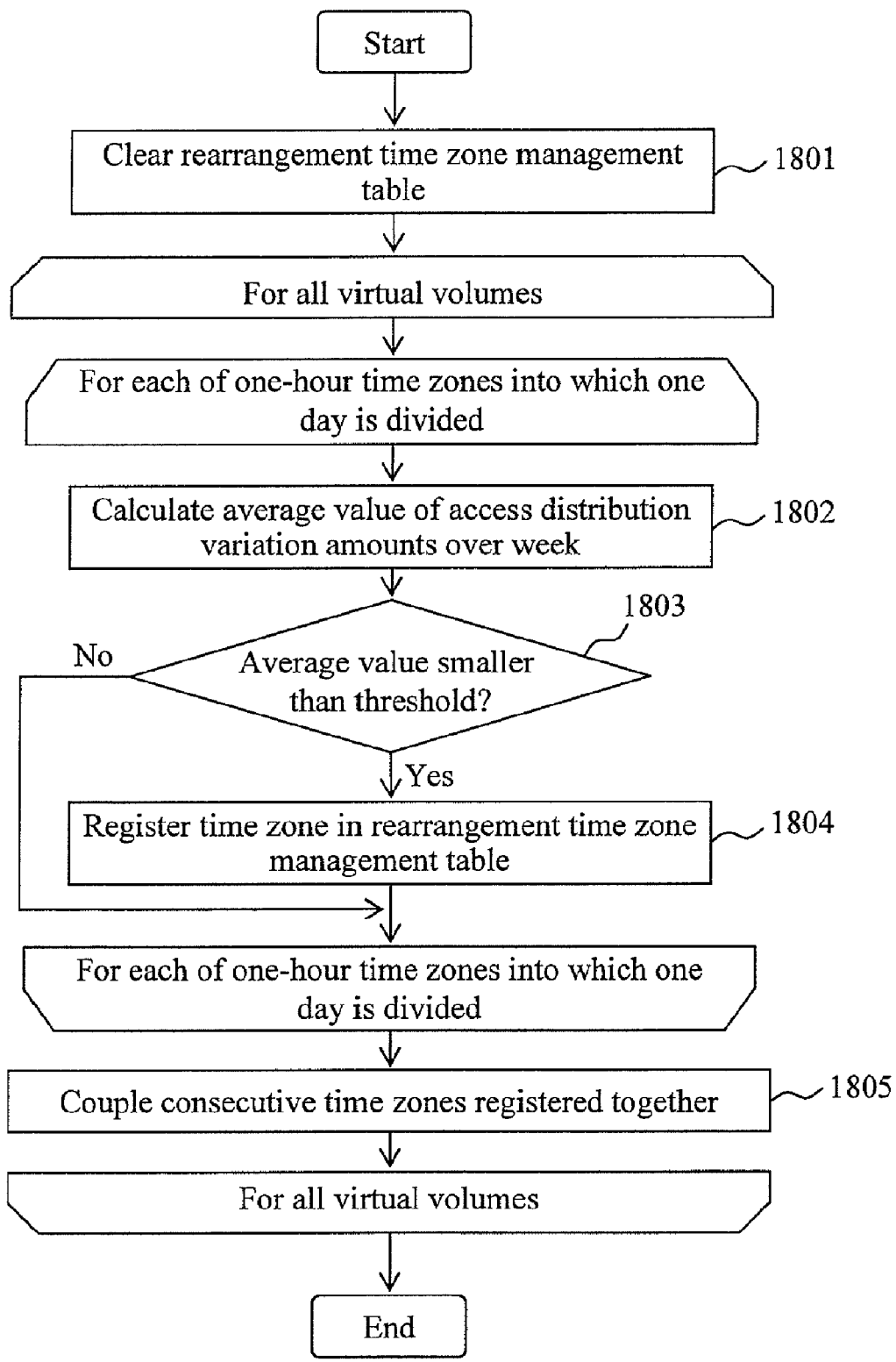
FIG. 18 is a flowchart illustrating a rearrangement hour(s) calculation process according to the first embodiment.

FIG. 18 is a flowchart illustrating the rearrangement hour(s) calculation process in detail. The rearrangement hour(s) calculation process is, for example, periodically or repeatedly carried out. However, the process need not be periodically carried out, and the time intervals at which the process is carried out may vary slightly.

(Contents of the Processing in Step 1801)

The configuration management program 804 in the management computer 103 clears the value in the rearrangement hour(s) 1003 in the rearrangement hour(s) management table 806. Then, the configuration management program 804 carries out the processing in the subsequent steps 1802 to 1805 on all the virtual volumes registered in the management-side VVOL management table 810. The process will be described below taking one virtual volume (referred to as the "target VVOL" in the description of FIG. 18) by way of example.

The configuration management program 804 carries out the processing in the subsequent steps 1802 to 1804 on, for example, each of the hour(s)s (hereinafter referred to as the target hour(s)) into which one day is divided and which correspond to the respective hours.

(Contents of the Processing in Step 1802)

The configuration management program 804 calculates the average value of the access distribution variation amounts 903 of the target VVOL over the target hour(s), for example, the average value of the access distribution variation amounts 903 over the last week. The period over which the average value is calculated may be, for example, two days or one month.

Furthermore, the storage administrator may be allowed to specify the period over which the average value is calculated. In this case, for example, in response to an instruction from the storage administrator, the configuration management program 804 displays a screen for configuring the period over which the average value is calculated, on the Web browsing computer 104. Moreover, the period over which the average value is calculated may vary among the virtual volumes or may be shared among a plurality of virtual volumes.

(Contents of the Processing in Step 1803)

The configuration management program 804 determines whether or not the calculated average value (hereinafter referred to as the distribution variation average) of the access distribution variation amounts 903 is smaller than the distribution variation threshold 1002 in the rearrangement hour(s) management table 806 which corresponds to the target VVOL. The value of the distribution variation threshold 1002 may be specified when or before the processing in 1803 is carried out. The detail of the process in which the distribution variation threshold 1002 specified will be described below in detail.

(Contents of the Processing in Step 1804)

If the distribution variation average is smaller than the distribution variation threshold 1002 (Yes in step 1803), the configuration management program 804 registers the target hour(s) in the rearrangement hour(s) management table 806. If the distribution variation average is equal to or larger than the distribution variation threshold 1002 (No in step 1803), the configuration management program 804 continues the processing (steps 1802 to 1804) for the next hour(s). The above-described processing is repeatedly carried out for each hour(s).

(Contents of the Processing in Step 1805)

For the rearrangement hour(s)s 1003 in the rearrangement hour(s) management table 806 which corresponds to the target VVOL, the configuration management program 804 carries out a process of integrating consecutive hour(s)s into one hour(s). Specifically, the configuration management program 804 locates a record in the rearrangement hour(s) management table 806 which has the same VVOL_ID as that of the target VVOL. If at least two records are located and at least two rearrangement hour(s)s in the located at least two records are consecutive, the configuration management program 804 integrates the hour(s)s together into one hour(s). For example, if the rearrangement hour(s)s are consecutive as in the case of 9:00-10:00, 10:00-11:00, and 11:00-12:00, the configuration management program 804 integrates the hour(s)s together into one hour(s) 9:00-12:00. The configuration management program 804 deletes all of the at least two records with the rearrangement hour(s)s thereof integrated together, and registers the resultant hour(s).

(Modification of the Rearrangement Hour(s) Calculation Process)

The rearrangement hour(s) calculation process has been described. In the rearrangement hour(s) calculation process, the configuration management program 804 may take into account not only the access distribution variation amount but also the information on the number of accesses to the target VVOL during the target hour(s), in determining whether or not to register the target hour(s) in the rearrangement hour(s) management table 806. Specifically, in step 1802, the configuration management program 804 calculates the average value of the access counts 904 of the target VVOL during the target hour(s) based on the access distribution variation history table 805.

In step 1803, the configuration management program 804 may determine to register the target hour(s) in the rearrangement hour(s) management table 806 only when the distribution variation average is smaller than the distribution variation threshold 1002 and when the average value of the access counts 904 is smaller than a given value (for example, a threshold specified or/and calculated separately from the distribution variation threshold 1002).

(Distribution Variation Threshold)

The distribution variation threshold 1002 used in step 1803 may be input by the storage administrator or calculated by the management computer 103. Here, the aspect in which the distribution variation threshold 1002 is input by the storage administrator will be described by way of example.

Figure 19:
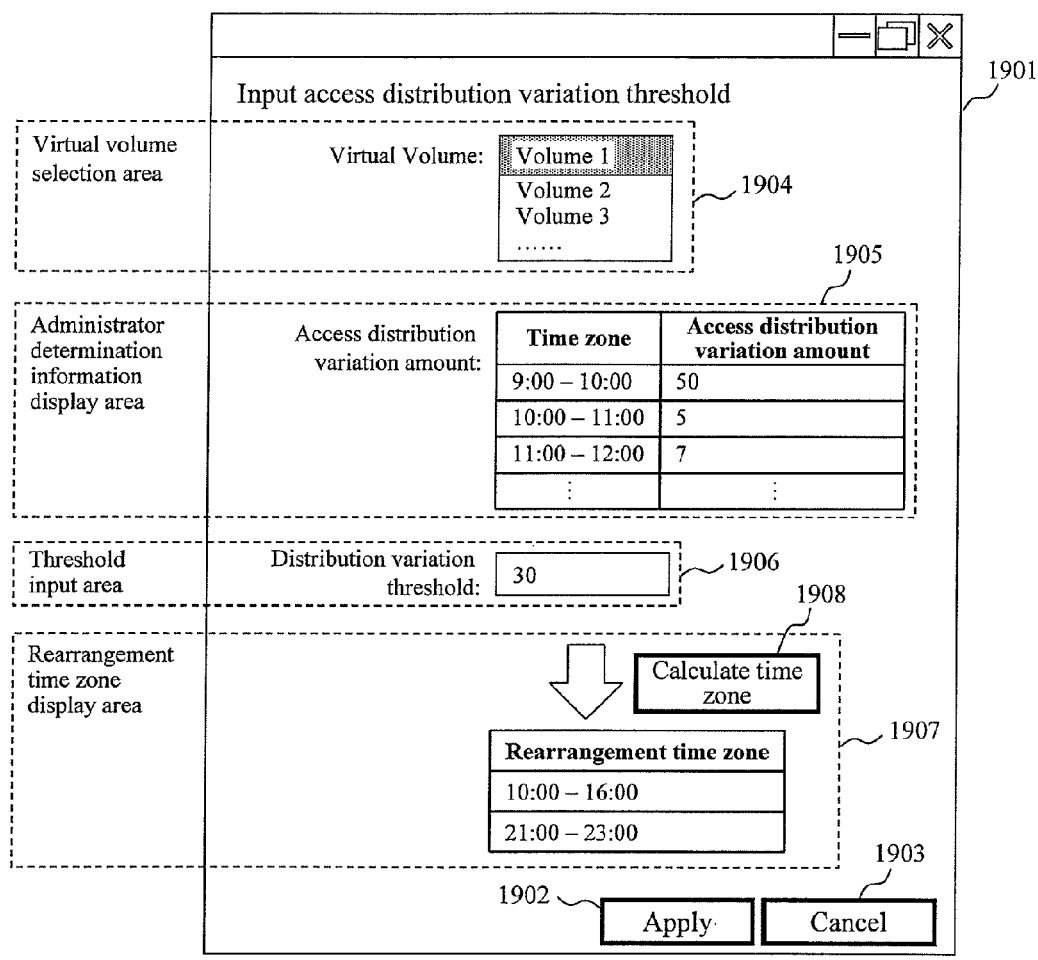
FIG. 19 is a diagram showing an example of configuration of a distribution variation threshold input screen 1901.

In the rearrangement hour(s) calculation process, the configuration management program 804 displays a distribution variation threshold input screen 1901 shown in FIG. 19, on the Web browsing computer 104. The screen 1901 includes an area (virtual volume selection area) 1904 that allows selection of any of the virtual volumes for which the distribution variation threshold is to be set and an area (threshold input area) 1906 via which a distribution variation threshold specified for the selected virtual volume is input.

The virtual volume selection area 1904 displays, for example, a list of the VVOLIDs 1001 corresponding to the virtual volumes registered in the rearrangement hour(s) management table 806. The storage administrator can select, for example, one of the IDs of the virtual volumes in the list.

The threshold input area 1906 displays, for example, a text box via which the distribution variation threshold is input. The distribution variation threshold corresponding to the virtual volume identified by the selected ID can be input via the text box.

The storage administrator uses the screen 1901 to input the distribution variation threshold, and depresses an Apply button 1902. Then, the configuration management program 804 stores the input value in the distribution variation threshold 1002 corresponding to the ID of the selected virtual volume on the screen 1901. The configuration management program 804 carries out step 1803 and the subsequent steps included in the rearrangement hour(s) calculation process.

Figure 20:
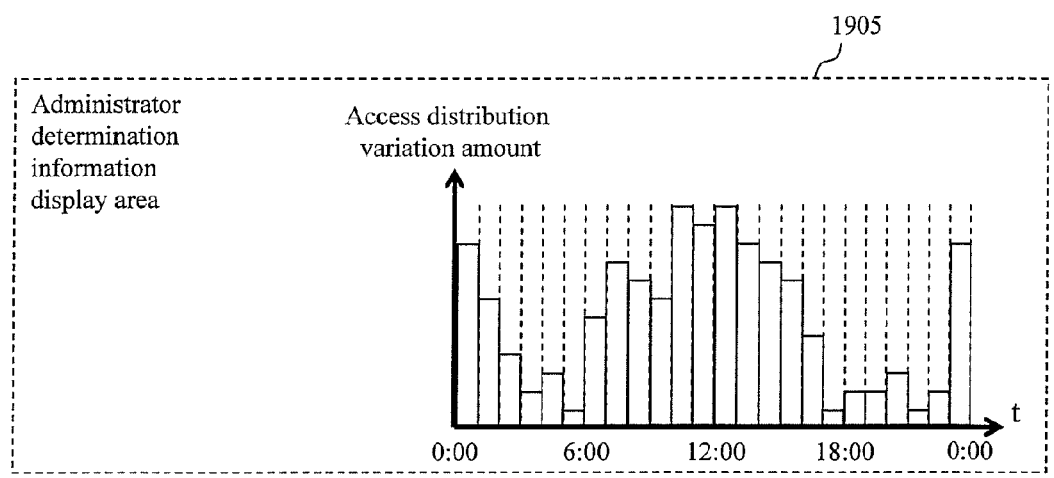
FIG. 20 is a diagram showing an example of an aspect of display, in graph form, of an access distribution variation amount in an administrator determination information display area 1905 of a screen 1901.

The screen 1901 may include an area (administrator determination information display area) 1905 displaying information that allows the storage administrator to determine the distribution variation threshold. For example, the screen 1901 may display the average value of the access distribution variation amounts over the hour(s)s into which one day is divided and which correspond to the respective hours; the average value is calculated in step 1802 for the rearrangement hour(s) calculation process. The average value may be displayed in the form of, for example, a table like the administrator determination information display area 1905 shown in FIG. 19 or a time series graph such as the one shown in FIG. 20. The display in graph form as shown in FIG. 20 effectively allows the administrator to visually determine a variation in access distribution to achieve sensory understanding.

Furthermore, when the distribution variation threshold is input, the configuration management program 804 may display rearrangement hour(s)s calculated using the input threshold, on the screen 1901 before registering the rearrangement hour(s)s in the rearrangement hour(s) management table 806. Then, the storage administrator can determine whether or not to register the rearrangement hour(s)s in the rearrangement hour(s) management table. In this case, the screen 1901 includes an area (rearrangement hour(s) display area) 1907 that displays the calculated rearrangement hour(s)s. Specifically, the configuration management program 804 prepares an intermediate table on the memory 803 at the beginning of the rearrangement hour(s) calculation process. In the screen 1901, the storage administrator input the distribution variation threshold to a threshold input area 1906 and then depresses, for example, a hour(s) calculation button 1908 instead of the Apply button 1902.

When the hour(s) calculation button 1908 is depressed, the configuration management program 804 carries out the processing between steps 1803 and 1805 using the value input to the threshold input area 1906 instead of the distribution variation threshold 1002 corresponding to the selected virtual volume. In this case, the configuration management program 804 records the rearrangement hour(s)s calculated in steps 1804 and 1805 in the intermediate table instead of the rearrangement hour(s) management table 806. The configuration management program 804 displays the information on the rearrangement hour(s)s recorded in the intermediate table, in the rearrangement hour(s) display area 1907 of the screen 1901.

The storage administrator may re-input the distribution variation threshold and depress the hour(s) calculation button 1908 again.

Every time the storage administrator re-inputs the distribution variation threshold, the configuration management program 804 uses the newly input threshold to calculate a rearrangement hour(s). The configuration management program 804 then records the rearrangement hour(s) in the intermediate table and displays the rearrangement hour(s) in the rearrangement hour(s) display area 1907. When the storage administrator depresses the Apply button 1902, the configuration management program 804 stores the value input to the threshold input area 1906, in the distribution variation threshold 1002. Furthermore, the configuration management program 804 registers the information on the rearrangement hour(s) recorded in the intermediate table, in the rearrangement hour(s) management table 806. The configuration management program 804 then deletes the intermediate table from the memory 803 to terminate the rearrangement hour(s) calculation process.

Moreover, the storage administrator instructs the configuration management program 804 to input a distribution variation threshold before carrying out the rearrangement hour(s) calculation process. In this case, during the rearrangement hour(s) calculation process, the storage administrator need not be prompted to input a distribution variation threshold. If the storage administrator instructs the configuration management program 804 to input a distribution variation threshold, the configuration management program 804 displays the screen 1901 on the Web browsing computer 104.

Alternatively, the storage administrator may instruct the configuration management program 804 to display a screen on which information on the access distribution can be browsed, instead of inputting a distribution variation threshold. In this case, the configuration management program 804 displays, for example, only the virtual volume selection area 1904 and the administrator determination information display area 1905 on the screen 1901.

Moreover, the configuration management program 804 may automatically calculate a distribution variation threshold. In this case, the storage administrator need not be prompted to input a distribution variation threshold. For example, the storage administrator inputs an upper limit on the number of rearrangement processes carried out within one day instead of a distribution variation threshold. The configuration management program 804 calculates such a distribution variation threshold as allows registration of rearrangement hour(s)s the number of which does not exceed the input upper limit number. Whether the distribution variation threshold is calculated by the configuration management program or input by the storage administrator may be determined by the storage administrator.

(vi) Rearrangement Process

Figure 21:
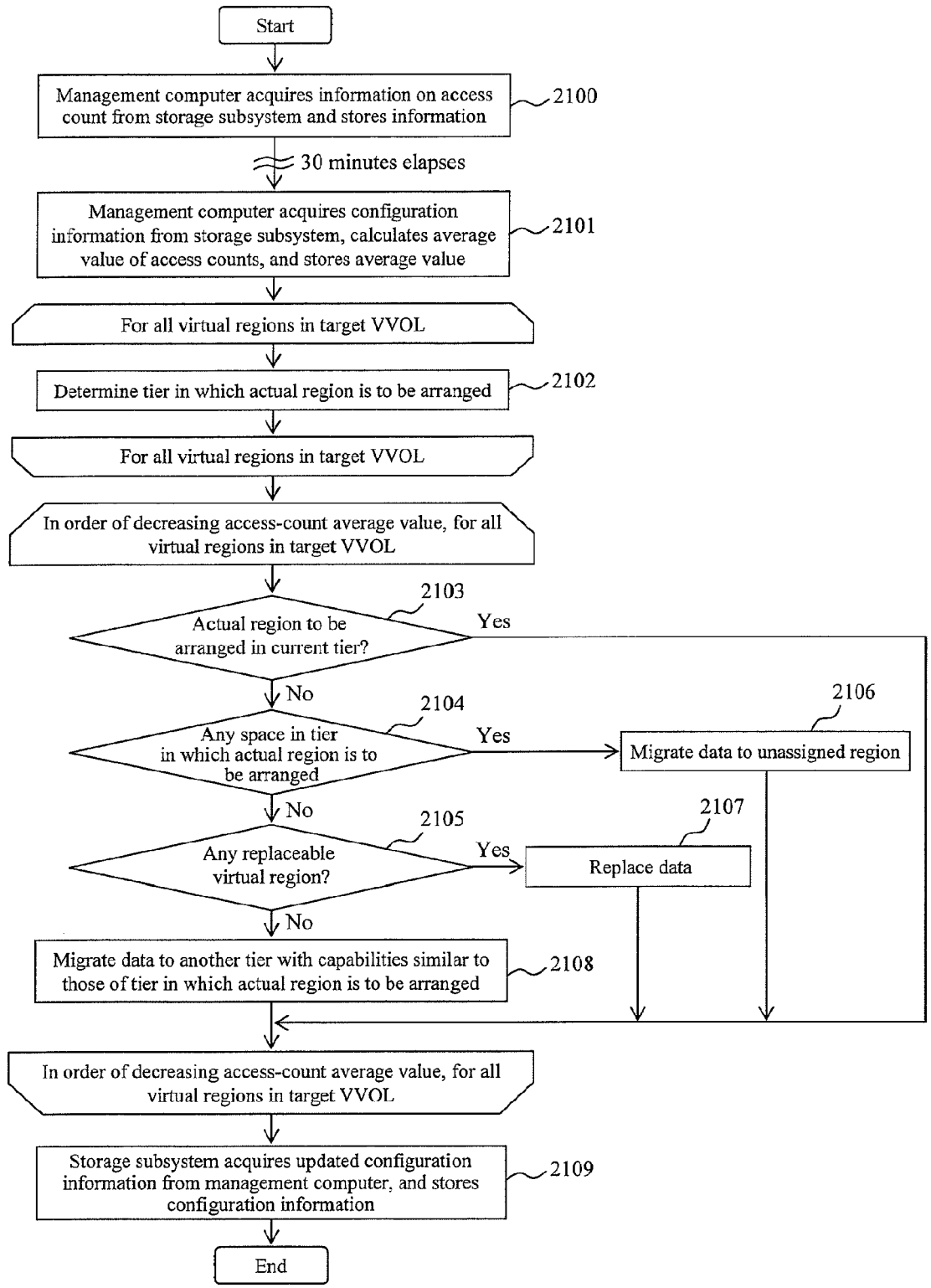
FIG. 21 is a flowchart illustrating a rearrangement process.

FIG. 21 is a flowchart illustrating the rearrangement process in detail. The rearrangement process is carried out on the virtual volume (referred to as the target VVOL in the description of FIG. 21) for which the rearrangement hour(s)s 1003 are registered in the rearrangement hour(s) management table 806, for each of the rearrangement hour(s)s 1003 corresponding to the target VVOL. The rearrangement process is carried out a given period, for example, 30 minutes, after the start time of each of the rearrangement hour(s)s registered in the rearrangement hour(s) management table 806 by the (v) rearrangement hour(s) calculation process.

(Contents of the Processing in Step 2100)

The configuration management program 804 in the management computer 103 acquires the values of the access counts 604 of all the virtual regions in the target VVOL, from the storage subsystem 102. The configuration management program 804 records the values in the start-time access count 1308 in the management-side VVOL management table 810. After carrying out step 2100, the configuration management program 804 stands by until a predetermined time (for example, 30 minutes) elapses. The configuration management program 804 may perform other processing as it stands by. That is, any process may be carried out any number of times within the standby time provided that the processing in step 2101 can be carried out a predetermined time after execution of step 2100.

(Contents of the Processing in Step 2101)

The configuration management program 804 acquires the values of the access counts 604 of all the virtual regions in the target VVOL, from the storage subsystem 102. The configuration management program 804 calculates the average value of the numbers of accesses to each virtual region over, for example, past 30 minutes. The configuration management program 804 then records the calculated average value in the average value 1309. Specifically, the configuration management program 804 calculates the average value of the access counts in accordance with (Expression 1). The configuration management program 804 then records the calculated average value in the average value 1309.

$$(\text{access count } 604 - \text{start-time access count } 1308)/\text{measurement period in seconds} \quad \text{(Expression 1)}$$

For example, values in FIGS. 6 and 13 for a virtual region with a VVOL_ID of Volume1 and a VVOL_LBA range of 0 to 999 are taken by way of example, and a measurement period of 30 minutes is substituted into (Expression 1). Then, $(792000 - 621000)/(30 \times 60) = 95$.

In this manner, the rearrangement process is carried out based on the information on the access count during the given period (for example, 30 minutes) from the start time of the rearrangement hour(s). Then, the rearrangement process can be carried out based on the information on the number of accesses to the virtual volume during the hour(s) in which the access distribution remains unvaried.

Furthermore, the configuration management program 804 acquires the information in the tables 308 to 310 from the storage subsystem 102, and updates the information in the tables 807 to 809 in the management computer 103 based on the acquired information.

(Contents of the Processing in Step 2102)

Then, for each of all the virtual regions in the target VVOL registered in the management-side VVOL management table 810, the configuration management program 804 determines a tier to be assigned to the target virtual region. Specifically, the configuration management program 804 determines an allowable IOPS range 1403 indicative of an access count range including the average value 1309 of the access counts corresponding to the target virtual region, based on the management-side tier definition table 809. The configuration management program 804 then records a tier ID 1401 corresponding to the allowable access count range 1403 as a value for rearrangement determination results 1305 for the target virtual region. As a result, the recorded tier ID may be the same as or different from that of a tier containing an actual region assigned to the virtual region. If plural types of values are recorded in the access count 1304 as values for allowing the tier resulting from the rearrangement determination in the rearrangement process, any one of the values may be selected or a value may be calculated, so as to be used to determine the allowable IOPS range 1403. Furthermore, a set of plural values may be used to determine the allowable IOPS range 1403. In this case, the set of plural values is specified in the allowable IOPS ranges 703 and 1403 in the tier definition table 310 and the management-side tier definition table 809, respectively.

(Repeated Process)

Then, the configuration management program 804 carries out the processing in steps 2103 to 2108 on all the virtual regions in the target VVOL registered in the management-side VVOL management table 810. However, here, the configuration management program 804 processes the virtual regions in order of decreasing access count average value 1309. The processing in the subsequent steps 2103 to 2108 will be described taking one virtual region (hereinafter referred to as the "target virtual region") by way of example.

(Contents of the Processing in Step 2103)

The configuration management program 804 determines whether or not the ID of the tier ("target region arrangement source tier") corresponding to the actual region assigned to the target virtual region matches the value for the rearrangement determination results 1305 corresponding to the target virtual region. Specifically, based on the ID 1303 of the actual region assigned to the target virtual region, the configuration management program 804 determines the ID 1201 of a RAID group containing the actual region. The configuration management program 804 further determines a tier ID 1401 corresponding to capability requirements 1402 that can be met by the device type 1102 or/and RAID level 1103 corresponding to the RAID group. The configuration management program 804 determines whether or not the determined tier ID 1401 matches the value for the rearrangement determination results 1305.

If the actual region is to be arranged in the target region arrangement source tier (Yes in step 2103), the data in the target virtual region need not be migrated. Thus, the processing on the target virtual region is terminated. On the other hand, if the actual region is not to be arranged in the target region arrangement source tier (No in step 2103), the process goes to step 2104.

(Contents of the Processing in Step 2104)

Based on the management-side actual region management table 808, the configuration management program 804 determines whether or not there is any unassigned actual region in the tier (hereinafter referred to as the "target region arrangement destination tier") indicated by the tier ID in the rearrangement determination results 1305 corresponding to the target virtual region.

If there is any space in the tier in which the actual region is to be arranged (Yes in step 2104), the process goes to step 2106. If there is no space in the tier in which the actual region is to be arranged (No in step 2104), the process goes to step 2105.

(Contents of the Processing in Step 2106)

The configuration management program 804 replaces the actual region ("data migration source actual region") currently assigned to the target virtual region with the unassigned actual region ("data migration destination actual region") in the target region arrangement destination tier. Specifically, the configuration management program 804 updates the value of the assignment status 1204 in the management-side actual region management table 808 corresponding to the data migration source actual region so that the value is indicative of the unassigned status. The configuration management program 804 updates the value of the assignment status 1204 corresponding to the data migration destination actual region so that the value is indicative of the assigned status. In the present embodiment, for example, the actual regions and the virtual regions are managed so as to have the same capacity, eliminating the need to take the capacities of the source and the destination into account.

Furthermore, the configuration management program 804 updates the value of the actual region ID 1303 in the management-side VVOL management table 810 which corresponds to the target virtual region, to the ID of the data migration destination actual region. Furthermore, the configuration management program 804 instructs the storage subsystem 102 to migrate the data from the data migration source actual region to the data migration destination actual region. The storage control program 307 in the storage subsystem 102 receives the instruction from the configuration management program 804 to migrate the data from the data migration source actual region to the data migration destination actual region.

Execution of the processing in step 2106 may affect the capabilities of the other virtual volumes. For example, in the rearrangement process for a certain virtual volume, execution of the processing in step 2106 may cause all the unassigned actual regions in a tier with high capabilities to be used up. In this case, none of the unassigned actual regions in this tier can be assigned to virtual regions in virtual volumes in which the reassignment process is subsequently carried out. Thus, if there is any virtual region to which an actual region in the tier is determined to be assigned, the assignment status and data of the virtual region are replaced with those of another virtual region with an actual region in the tier assigned thereto or an actual region in another tier with similar capabilities is assigned to this virtual region as in the case of the processing in steps 2107 and 2108 described below. This may affect the capabilities. To deal with this case, a possible method optimizes the status of assignment of an actual region to a virtual region in the target VVOL in the rearrangement process by avoiding assigning an unassigned actual region to the virtual region in the target VVOL and simply constantly replacing the virtual region with another virtual region in the target VVOL. Whether or not an unassigned actual region is used for the rearrangement process is determined by the configuration management program 804 depending on the number or/and rate of the unassigned actual regions in each tier. Specifically, in the processing in step 2104, even if there are unassigned actual regions in the target region arrangement destination tier, when the number of the unassigned actual regions is smaller than 10% of the total number of actual regions in the target region arrangement destination tier, the configuration management program 804 migrates to the processing in step 2105 instead of the processing in step 2106.

(Contents of the Processing in Step 2105)

The configuration management program 804 determines whether or not there is any actual region with data that can be replaced with the data in the actual region assigned to the target virtual region. Specifically, the configuration management program 804 determines whether or not the tier ID of the target area arrangement source tier matches any of the tier IDs in the rearrangement determination results 1305 corresponding to the virtual regions with the assigned actual regions in the target region arrangement destination tier assigned thereto.

If there is any replaceable actual region (Yes in step 2105), the process goes to step 2107. If there is no replaceable actual region (No in step 2105), the process goes to step 2108.

(Contents of the Processing in Step 2107)

The configuration management program 804 replaces the status of assignment to the virtual region between the actual region (referred to as the "target actual region 1" in the description of step 2107) assigned to the target virtual region and an assigned actual region (referred to as the "target actual region 2" in the description of step 2107) in the target region arrangement destination tier. Specifically, in the actual region ID 1303 in the management-side VVOL management table 810, the configuration management program 804 stores the ID of the target actual region 2 in a part in which the ID of the target actual region 1 is stored, and stores the ID of the target actual region 1 in a part in which the ID of the target actual region 2 is stored. Furthermore, the configuration management program 804 instructs the storage subsystem 102 to migrate the data between the target actual regions 1 and 2. The storage control program 307 in the storage subsystem 102 receives the instruction from the configuration management program 804 to migrate the data between the actual regions.

For example, the storage control program 307 achieves the data migration by carrying out the processing described below. The cache memory region in the processing described below may be an unassigned actual region in the storage subsystem 102.

Procedure 1: the storage control program 307 writes the data of the target actual region 1 to the cache memory region.

Procedure 2: the storage control program 307 writes the data of the target actual region 2 to the cache memory region.

Procedure 3: the storage control program 307 writes the data of the target actual region 1 from the cache memory region to the target actual region 2.

Procedure 4: the storage control program 307 writes the data of the target actual region 2 from the cache memory region to the target actual region 1.

(Contents of the Processing in Step 2108)

The configuration management program 804 migrates the data in the actual region assigned to the target virtual region, to an unassigned actual region in a tier with capabilities most similar to those of the target tier. Furthermore, the configuration management program 804 updates the management-side VVOL management table 810 and the management-side actual region management table 808.

(Contents of the Processing in Step 2109)

The configuration management program 804 instructs the storage subsystem 102 to acquire the information in the tables updated by the above-described rearrangement process and to update the information in the tables in the storage subsystem 102.

The storage control program 307 in the storage subsystem 102 receives the instruction from the configuration management program 804 to acquire the information in the tables 807 to 809 in the management computer 103. Based on the information acquired, the storage control program 307 updates the information in the tables 308 to 310 in the storage subsystem 102.

(2) Second Embodiment

Figure 24:
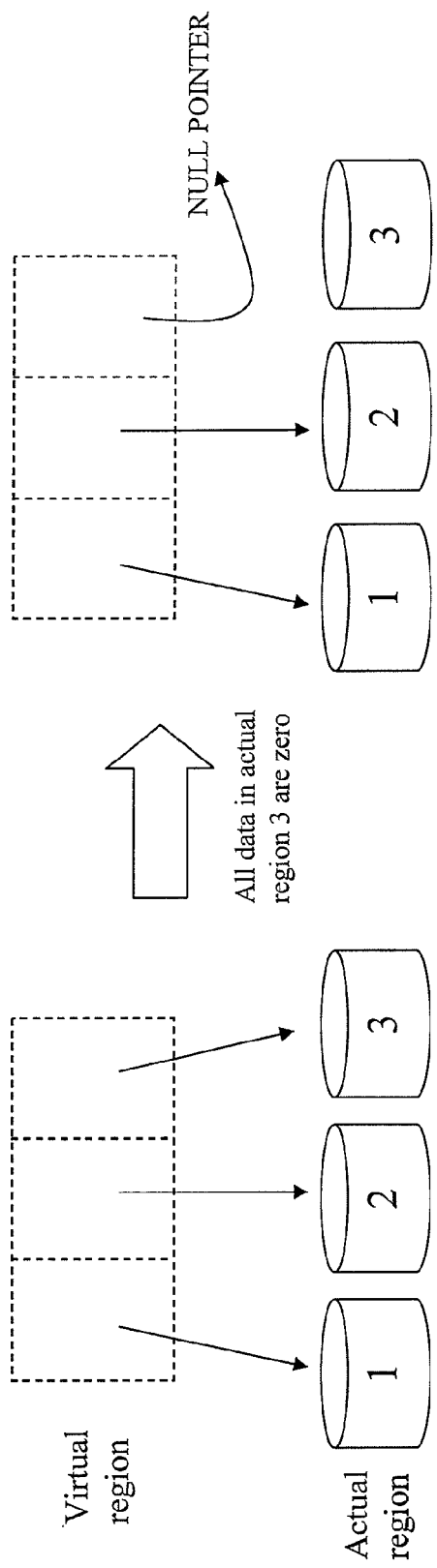
FIG. 24 is a diagram showing the concept of a process (zero reclamation) in which if all data in an actual region are zero, a virtual region corresponding to the actual region is made unassigned.

In a second embodiment, if zero data (data with all bits specified as zero) is stored in an actual region assigned to a virtual region, a storage subsystem changes the virtual region to an unassigned one (such a virtual region is hereinafter referred to as a "zero-data virtual region"). More specifically, if all the data in the actual region are zero, the corresponding virtual region is provided with a NULL_Pointer (a pointer indicating that nothing is assigned to the virtual region) and changes to an unassigned one. Upon receiving a read request for an unassigned virtual region from the host computer, the storage subsystem transmits zero data instead of an error. This technique is called "zero reclamation". FIG. 24 is a diagram showing the concept of the zero reclamation.

In this case, for zero-data virtual regions included in the unassigned virtual regions, the storage subsystem measures the access count, for example, as in the case of assigned virtual regions.

<Configurations of the System and Apparatus as Well as Management Information>

In the second embodiment, the configurations of a computer system, a host apparatus, the storage subsystem, and a management system are similar to those in the first embodiment but are different from those in the first embodiment in the information contained in the VVOL management table 311 and the management-side VVOL management table 810. Only differences from the first embodiment will be described below.

FIG. 22 is a diagram showing the configuration of the VVOL management table 311 according to the second embodiment. FIG. 23 is a diagram showing the configuration of the management-side VVOL management table 810 according to the second embodiment.

The VVOL management table 311 and management-side VVOL management table 810 according to the second embodiment are different from those according to the first embodiment in that information corresponding to unassigned virtual regions can be stored in the VVOL management table 311 and management-side VVOL management table 810 according to the second embodiment by storing a null value (zero value) indicative of the absence of a value in each of actual region IDs 2203 and 2303 and rearrangement determination results 2205 and 2305. Thus, the null value is stored in the actual region corresponding to the zero-data virtual region. An access to the virtual region always results in return of zero data.

In the second embodiment, for each zero-data virtual region, information corresponding to the virtual region remains registered in the VVOL management table 311 and the management-side VVOL management table 810 even if the virtual region is unassigned. Thus, in the access distribution variation amount calculation process, the access distribution variation amount of each virtual volume can be accurately calculated also using information on the access counts of the zero-data virtual regions. Furthermore, in the rearrangement hour(s) calculation process, rearrangement hour(s)s for the virtual volume can be accurately calculated based on the access distribution variation amount of the virtual volume calculated also using the information on the access counts of the zero-data virtual regions.

As described above, in the second embodiment, each virtual region with zero data stored therein is unassigned. Instead, a predetermined actual region (hereinafter referred to as a base actual region) managed by the storage subsystem may be assigned to the virtual region. Upon receiving a read request for the virtual region from the host computer, the storage subsystem needs to generate and return zero data if the virtual region is unassigned, in accordance with the rule that "zero data be returned in response to a read request for an unassigned virtual region". However, if there is any base actual region, then with zero data pre-stored in the base actual region, data to be returned to the host computer can be acquired by processing similar to that for other assigned virtual regions.

<Contents of Processing>

Now, processing carried out in the second embodiment will be described. The processing carried out in the second embodiment is different from that carried out in the first embodiment as described below.

(i) If a read target virtual region is not registered in the VVOL management table 311 when the storage control program 307 receives a read request transmitted by the host computer 101, the storage control program 307 transmits an error to the host computer 101. Furthermore, if the read target virtual region is registered in the VVOL management table 311 but the actual region ID 2203 corresponding to the virtual region has a null value (the virtual region is a zero-data virtual region), the storage control program 307 transmits zero data to the host computer 101 instead of the data in the actual region.

(ii) If write target data is zero data when the storage control program 307 receives a write request transmitted by the host computer 101, then for the actual region identified by the actual region ID 2203 corresponding to the write target virtual region, the storage control program 307 stores a value for an unassigned virtual region in an assignment status 504 in an actual region management table 309 which corresponds to the actual region. Furthermore, the storage control program 307 stores a null value in each of the actual region ID 2203 and rearrangement determination results 2205 corresponding to the write target virtual region.

(iii) In the rearrangement process, the rearrangement determination process is not carried out on unassigned ones of the virtual regions registered in the VVOL management table 311 and management-side VVOL management table 810. Only the reassignment process will be described below in detail.

<Details of the Rearrangement Process>

Figure 25:
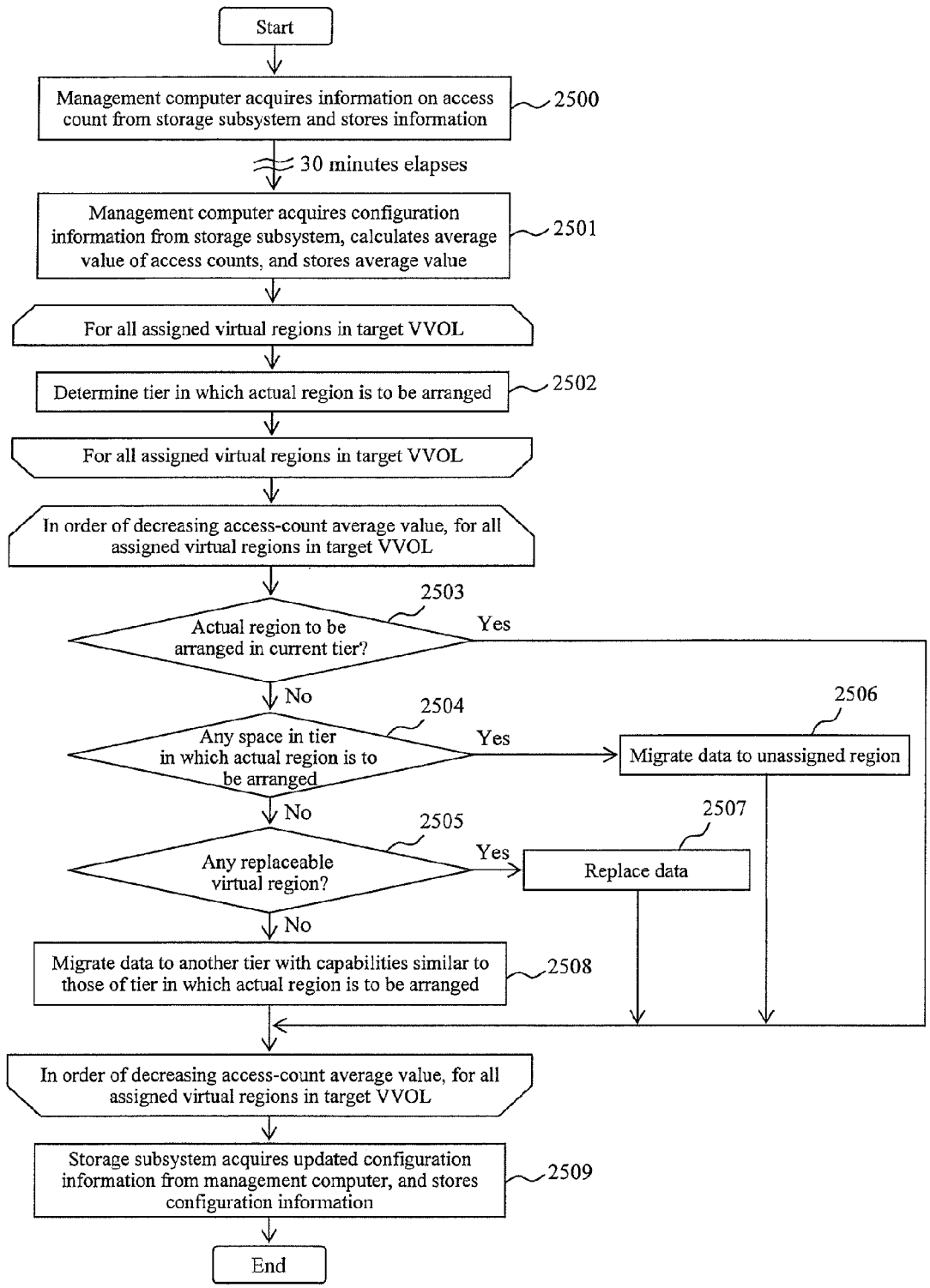
FIG. 25 is a flowchart illustrating a rearrangement process according to the second embodiment.

FIG. 25 is a flowchart illustrating the rearrangement process according to the second embodiment in detail. The rearrangement process carries out the processing between steps 2502 and 2509 only on assigned ones of the virtual regions registered in the management-side VVOL management table 810. Specifically, the configuration management program 804 avoids carrying out the processing between steps 2502 and 2509 on the virtual regions for which only a null value is assigned to each of the actual region ID 2303 or/and rearrangement determination results 2305 in the management-side VVOL management table 810. The configuration management program 804 thus migrates to processing of the next virtual region.

(3) Conclusion (i) As described above, in Patent Literature 1, the process of migrating storage devices is carried out depending on the number of data accesses. This is to maintain the capabilities of storage devices requested in the data access request and to efficiently utilize the physical storage devices in the storage subsystem. The efficiency with which the physical storage devices in the storage subsystems are utilized increases consistently with the time for which the data is located in a device corresponding to the access status. Thus, the data access status after the migrating is expected to remain suitable, as long as possible, for the characteristics of the device to which the data has been migrated.

However, the status of accesses to virtual regions is not necessarily constant. For example, online process applications process many requests at high speeds. Thus, the requests processed by the online process application may be switched at short intervals. In this case, the data accessed by the online process application changes at short time intervals because the data accessed during processing varies depending on the request. Accordingly, the virtual region in the storage subsystem accessed by the online process application also changes at short time intervals. Therefore, the frequency of accesses to each of the virtual regions in the storage subsystem is expected to vary at short time intervals.

In this situation, even when a device with characteristics suitable for storage of the data is determined based on the past history of accesses to the data and the data is migrated to this device as described in Patent Literature 1, the access status of the data changes immediately, making the device unsuitable for storage of the data. Furthermore, when the data is migrated in response to every change in access status, the data migration is frequency performed. This may affect the capabilities of the whole storage subsystem.

Thus, the present invention detects a variation in the position (address or address range) of the hot spot virtual region in the virtual volume, and presents the administrator with a hour(s) with a variation amount smaller than a specified threshold, as a candidate for a data migration hour(s). Then, when the data is to be migrated, only if the migration is expected to remain effective over a long period, the data is migrated to an actual region in a device more suitable for storage of the data based on the history of accesses to the data (access distribution variation amount).

(ii) To achieve this, the management system according to the first embodiment of the present invention calculates the access distribution variation amount (load lumped region variation information) indicative of a variation in the position (address or address range) of the virtual region in each virtual volume which corresponds to the hot spot. The management system then, based on the access distribution variation amount, determines and displays the load position (address or address range) unvaried hour(s) indicative of the hour(s) in which the position (address or address range) of the virtual region corresponding to the hot spot is unvaried (the position (address or address range) varies insignificantly or the hot spot is stable), on the display device. This allows the administrator to know candidates for the hour(s) (rearrangement hour(s)) in which the status of assignment of the actual regions to the virtual regions in each virtual volume is reviewed.

More specifically, the management system acquires the amount of access load from the host computer to a plurality of virtual regions in the virtual volume, at a plurality of timings (the amount is periodically and repeatedly acquired, but the timings need not necessarily be periodical). The management system calculates the value of the difference in access load amount between contiguous different ones of the plurality of timings, for each of the plurality of virtual regions. The management system then statistically processes the obtained difference values to calculate information on the access variation amount (see FIG. 17). This allows variation in virtual regions corresponding to hot spots to be quantitatively measured.

Furthermore, the management system divides one day into a plurality of hour(s)s and calculates the average value of the access distribution variation amounts over a specified period for each hour(s). The management system then determines whether or not the average value is smaller than a specified threshold (which can be specified by the administrator). If there are consecutive hour(s)s corresponding to average values smaller than the threshold, the management system couples the consecutive hour(s)s together into a load position (address or address range) unvaried hour(s). This allows the access distribution variation amount to be measured over a longer period to determine the hour(s) in which the position (address or address range) of the virtual region corresponding to the hot spot is unvaried. Additionally, the present invention allows the rearrangement hour(s) to be determined by flexibly dealing with the case where the load position (address or address range) unvaried hour(s) varies (the load position (address or address range) unvaried hour(s) may be relatively short or somewhat long) depending on the type of processing carried out on the access (for example, processing carried out by the application in the daytime or batch processing carried out at night).

Moreover, the management system rearranges the data stored in the actual regions, during the load position (address or address range) unvaried hour(s). Specifically, the management system calculates the average value of the access counts over a predetermined time (for example, 30 minutes) after the start of the load position (address or address range) unvaried hour(s). Then, based on the access-count average value and the configuration information on the storage subsystem, the management system determines the tier in which the data in the actual region corresponding to the target virtual region is to be arranged. Moreover, if the determined tier is different from the current tier in which the data in the actual region corresponding to the target virtual region is arranged, the management system migrates the data in the actual region corresponding to the target virtual region to the tier (determined tier) different from the current one. By doing this, with the position (address or address range) of the hot spot stabilized, the actual region corresponding to the virtual region with a large access count can be migrated to a storage device in the tier in which the actual region is originally to be arranged. If there is no space in the determined tier, data rearrangement may be performed by replacing the data stored in the determined tier with the data in the actual region corresponding to the target virtual region. When the data in the actual region for the virtual region corresponding to the host spot, involving a large access count, is thus migrated to an actual region that is relatively unlikely to be affected by a decrease in tier level, even a storage subsystem with no extra capacity can be efficiently operated.

As described above, according to the first embodiment, the storage administrator can carry out the rearrangement process during the hour(s) in which the migration can be efficiently performed, simply by periodically inputting the access distribution variation amount threshold without the need to continuously monitor the status of accesses from the host computer to the virtual volume. Therefore, the physical storage devices in the storage subsystem can be efficiently used.

(iii) In the second embodiment of the present invention, the management system assigns zero data to those of the virtual regions in the virtual volume to which no data has been assigned. The management system thus manages these virtual regions as zero-data virtual regions. This enables the number of accesses to the unassigned virtual region to be counted, thus allowing the access distribution and the variation amount thereof to be more accurately monitored.

In rearranging the data, the management system acquires the average value of the access counts over a predetermined time (for example, 30 minutes) after the start of the rearrangement hour(s) (load position (address or address range) unvaried hour(s)), for all the virtual regions in the virtual volume other than the zero-data virtual regions. Then, based on the access-count average value and the configuration information on the storage subsystem, the management system determines the tier in which the data in the actual region corresponding to the target virtual region is to be arranged. Moreover, if the determined tier is different from the current tier in which the data in the actual region corresponding to the target virtual region is arranged, the management system migrates the data in the actual region corresponding to the target virtual region, to the determined tier. This enables the zero-data virtual regions to be removed from the rearrangement process target, allowing the rearrangement process to be efficiently carried out. Furthermore, with the position (address or address range) of the hot spot stabilized, the actual region corresponding to the virtual region with a large access count can be migrated to a storage device in the tier in which the actual region is originally to be arranged. Also in the second embodiment, if there is no space in the determined tier, data rearrangement may be performed by replacing the data stored in the determined tier with the data in the actual region corresponding to the target virtual region.

As described above, in the second embodiment, unassigned virtual regions may be registered in the management-side VVOL management table 810. Since there is no actual region assigned to the unassigned virtual regions, the data migration between actual regions cannot be performed. Thus, the second embodiment avoids carrying out rearrangement determination on the unassigned actual regions as described above.

(iv) In the first and second embodiment, the number of accesses is counted by counting the number of I/Os to and from the LBA range of the virtual volumes in the storage subsystem 102. However, the method for counting the number of accesses is not limited to this aspect. For example, the following method is possible. An agent is provided in the host computer 101. The agent catches an I/O request issued by, for example, an application in the host computer and notifies the management computer 103 of the I/O request. Then, the management computer 103 checks the I/O request against the management-side actual region management table 808 and management-side VVOL management table 810 held in the management computer 103. The management computer 103 thus determines which of the virtual regions is being accessed to count the number of accesses. In this case, the management computer 103 and the host computer 101 are preferably connected together via a network.

(v) The present invention may be implemented by software program codes configured to realize the functions of the embodiments. In this case, a storage medium with the program codes recorded therein is provided to a system or an apparatus. A computer (or a CPU or an MPU) in the system or apparatus then reads the program codes stored in the storage medium. In this case, the program codes themselves read from the storage medium implement the functions of the embodiments. The program codes themselves and the storage medium with the program codes stored therein form the present invention. The storage medium for supplying the program codes may be, for example, a flexible disk, a CD-ROM, a DVD-ROM, a hard disk, an optical disk, a magnetooptic disk, a CD-R, a magnetic tape, a nonvolatile memory card, or a ROM.

Alternatively, based on instructions in the program codes, an OS (Operating System) or the like operating on the computer may carry out a part or all of the actual processing so that the processing can implement the functions of the embodiments. Moreover, the program codes read from the storage medium may be written to a memory on the computer. Then, based on the instructions in the program codes, the CPU or the like in the computer may carry out a part or all of the actual processing so that the processing can implement the functions of the embodiments.

Alternatively, the software program codes configured to implement the functions of the embodiments may be distributed via a network. The program codes may then be stored in storage means such as a hard disk or a memory in the system or apparatus, or a storage medium such as a CD-RW or a CD-R. Then, when the program codes are used, the computer (or CPU or MPU) in the system or apparatus may read and execute the program codes stored in the storage means or the storage medium.

REFERENCE SIGNS LIST

10 . . . Computer system
101 . . . Host computer
102 . . . Storage subsystem
103 . . . Management computer
104 . . . Web browsing computer
105 . . . Storage area network
106 . . . Management network
107 . . . Management system

The invention claimed is:

1. A management method for a computer system comprising a host computer, a storage subsystem including an actual region that is a substantive storage region and a virtual volume associated with the actual region, and a management system configured to manage the storage subsystem, the storage subsystem including a plurality of virtual regions comprising a plurality of partial regions into which the virtual volume is divided,
   wherein the management system acquires load lumped region variation information indicative of a variation in a position of the virtual region in the virtual volume which corresponds to a hot spot,
   the management system determines a load position unvaried hour(s) indicative of a hour(s) during which the position of the virtual region corresponding to the hot spot is unvaried, based on the load lumped region variation information, and
   the management system displays the determined load position unvaried hour(s) on a display device.

2. A management method according to claim 1, wherein to acquire the load lumped region variation information,
   the management system acquires an amount of access load from the host computer to the plurality of virtual regions in the virtual volume, at a plurality of points in time,
   for each of the plurality of virtual regions, calculates a value of a difference between the access load amounts acquired at different points in time of the plurality of points in time, and
   statistically processes the calculated difference values to calculate the load lumped region variation information.

3. A management method according to claim 2, wherein to determine the load position unvaried hour(s),
   the management system divides one day into a plurality of hour(s)s and calculates an average value of the load lumped region variation information over a specified period for each hour(s),
   determines whether or not the average value is smaller than a specified threshold, and
   if there are consecutive hour(s)s each corresponding to the average value smaller than the threshold, couples the consecutive hour(s)s into the load position unvaried hour(s).

4. A management method according to claim 1, wherein furthermore, the management system rearranges data stored in the actual region during the load position unvaried hour(s).

5. A management method according to claim 4, wherein to rearrange the data,
   the management system acquires information on an access count during the load position unvaried hour(s),
   determines a tier in which the data in the actual region corresponding to the target virtual region is to be arranged, based on the information on the access count and configuration information on the storage subsystem, and
   if the determined tier is different from the current tier in which the data in the actual region corresponding to the target virtual region is arranged, migrates the data in the actual region corresponding to the target virtual region to the tier that is different from the current tier.

6. A management method according to claim 5, wherein if there is no space in the determined tier, the management system performs data rearrangement by replacing the data stored in the determined tier with the data in the actual region corresponding to the target virtual region.

7. A management method according to claim 4, wherein the management system assigns zero data to virtual regions in the virtual volume to which no data has been assigned and manages the unassigned virtual regions as zero-data virtual regions, and
   to rearrange the data, for all the virtual regions in the virtual volume other than the zero-data virtual regions,
   the management system acquires information on an access count during the load position unvaried hour(s),
   determines a tier in which the data in the actual region corresponding to the target virtual region is to be arranged, based on the information on the access count and configuration information on the storage subsystem, and
   if the determined tier is different from the current tier in which the data in the actual region corresponding to the target virtual region is arranged, migrates the data in the actual region corresponding to the target virtual region, to the tier that is different from the current tier.

8. A management method according to claim 1, wherein i) to acquire the load lumped region variation information,
   the management system acquires an amount of access load from the host computer to the plurality of virtual regions in the virtual volume, at a plurality of points in time,
   for each of the plurality of virtual regions, calculates a value of a difference between the access load amounts acquired at different points in time of the plurality of points in time, and
   statistically processes the calculated difference values to calculate the load lumped region variation information,
   (ii) to determine the load position unvaried hour(s),
   the management system divides one day into a plurality of hour(s)s and calculates an average value of the load lumped region variation information over a specified period for each hour(s),
   determines whether or not the average value is smaller than a specified threshold, and
   if there are consecutive hour(s)s each corresponding to the average value smaller than the threshold, couples the consecutive hour(s)s into the load position unvaried hour(s), and
   (iii) the management method further calculates an average value of access counts over a predetermined time from a beginning of the load position unvaried hour(s),
   determines a tier in which the data in the actual region corresponding to the target virtual region is to be arranged, based on the average value of the access counts and configuration information on the storage subsystem, and
   if the determined tier is different from the current tier in which the data in the actual region corresponding to the target virtual region is arranged, migrates the data in the target virtual region to the tier that is different from the current tier, and
   updates the configuration information on the storage subsystem after the rearrangement.

9. A management system configured to manage a storage subsystem including an actual region that is a substantive storage region and a virtual volume associated with the actual region, the management system comprising:
- a processor configured to execute a calculation;
- a memory in which information is stored; and
- a communication port configured to communicate with the storage subsystem,
- wherein the processor acquires load lumped region variation information indicative of a variation in a position of the virtual region in the virtual volume which corresponds to a hot spot,
- determines a load position unvaried hour(s) indicative of a hour(s) during which the position of the virtual region corresponding to the hot spot is unvaried, based on the load lumped region variation information, and
- stores the determined load position unvaried hour(s) in the memory and displays the load position unvaried hour(s) on a display device.

10. A management system according to claim 9, wherein to acquire the load lumped region variation information,
- the processor acquires an amount of access load from the host computer to the plurality of virtual regions in the virtual volume, at a plurality of points in time,
- for each of the plurality of virtual regions, calculates a value of a difference between the access load amounts acquired at different points in time of the plurality of points in time, and
- statistically processes the calculated difference values to calculate the load lumped region variation information.

11. A management system according to claim 10, wherein to determine the load position unvaried hour(s),
- the processor divides one day into a plurality of hour(s)s and calculates an average value of the load lumped region variation information over a specified period for each hour(s),
- determines whether or not the average value is smaller than a specified threshold, and
- if there are consecutive hour(s)s each corresponding to the average value smaller than the threshold, couples the consecutive hour(s)s into the load position unvaried hour(s).

12. A management system according to claim 9, wherein the processor acquires information on an access count during the load position unvaried hour(s),
- determines a tier in which the data in the actual region corresponding to the target virtual region is to be arranged, based on the information on the access count and configuration information on the storage subsystem, and
- if the determined tier is different from the current tier in which the data in the actual region corresponding to the target virtual region is arranged, migrates the data in the actual region corresponding to the target virtual region, to the tier that is different from the current tier.

13. A management system according to claim 12, wherein if there is no space in the determined tier, the processor performs data rearrangement by replacing the data stored in the determined tier with the data in the actual region corresponding to the target virtual region.

14. A management system according to claim 9, wherein the processor assigns zero data to virtual regions in the virtual volume to which no data has been assigned and manages the unassigned virtual regions as zero-data virtual regions, and
- for all the virtual regions in the virtual volume other than the zero-data virtual regions,
- the processor acquires information on an access count during the load position unvaried hour(s),
- determines a tier in which the data in the actual region corresponding to the target virtual region is to be arranged, based on the information on the access count and configuration information on the storage subsystem, and
- if the determined tier is different from the current tier in which the data in the actual region corresponding to the target virtual region is arranged, migrates the data in the actual region corresponding to the target virtual region, to the tier that is different from the current tier.

15. A management system according to claim 9, wherein i) to acquire the load lumped region variation information,
- the processor acquires an amount of access load from the host computer to the plurality of virtual regions in the virtual volume, at a plurality of points in time,
- for each of the plurality of virtual regions, calculates a value of a difference between the access load amounts acquired at different points in time of the plurality of points in time, and
- statistically processes the calculated difference values to calculate the load lumped region variation information,
- (ii) to determine the load position unvaried hour(s),
- the management system divides one day into a plurality of hour(s)s and calculates an average value of the load lumped region variation information over a specified period for each hour(s),
- determines whether or not the average value is smaller than a specified threshold, and
- if there are consecutive hour(s)s each corresponding to the average value smaller than the threshold, couples the consecutive hour(s)s into the load position unvaried hour(s), and
- (iii) the management system further calculates an average value of access counts over a predetermined time from a beginning of the load position unvaried hour(s),
- determines a tier in which the data in the actual region corresponding to the target virtual region is to be arranged, based on the average value of the access counts and configuration information on the storage subsystem, and
- if the determined tier is different from the current tier in which the data in the actual region corresponding to the target virtual region is arranged, migrates the data in the target virtual region to the tier that is different from the current tier, and
- updates the configuration information on the storage subsystem after the rearrangement.

* * * * *